(12) United States Patent
Tokuchi

(10) Patent No.: US 11,689,794 B2
(45) Date of Patent: Jun. 27, 2023

(54) INFORMATION PROCESSING DEVICE, INFORMATION PROCESSING METHOD, AND NON-TRANSITORY COMPUTER READABLE MEDIUM

(71) Applicant: FUJIFILM BUSINESS INNOVATION CORP., Tokyo (JP)

(72) Inventor: Kengo Tokuchi, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 38 days.

(21) Appl. No.: 17/379,230

(22) Filed: Jul. 19, 2021

(65) Prior Publication Data

US 2022/0239812 A1 Jul. 28, 2022

(30) Foreign Application Priority Data

Jan. 22, 2021 (JP) ................................ 2021-008929

(51) Int. Cl.
*H04N 7/15* (2006.01)
*H04N 23/56* (2023.01)
*H05B 47/155* (2020.01)

(52) U.S. Cl.
CPC ............ *H04N 23/56* (2023.01); *H04N 7/15* (2013.01); *H05B 47/155* (2020.01)

(58) Field of Classification Search
CPC ......... H04N 5/225; H04N 5/15; H05B 47/155
USPC ............................................ 348/14.01–14.16
See application file for complete search history.

(56) References Cited

U.S. PATENT DOCUMENTS

| | | | |
|---|---|---|---|
| 2009/0175555 A1* | 7/2009 | Mahowald | H04N 7/15 382/274 |
| 2010/0317398 A1 | 12/2010 | Thorn | |
| 2015/0049157 A1* | 2/2015 | Krishnamoorthy | H04L 65/1089 348/14.1 |
| 2015/0264313 A1* | 9/2015 | Bright-Thomas | G06V 10/40 348/14.08 |
| 2017/0324933 A1* | 11/2017 | Alrod | G06V 40/161 |
| 2020/0372475 A1* | 11/2020 | Bastide | G06Q 10/1095 |
| 2022/0182524 A1* | 6/2022 | Rewatkar | H04N 7/15 |
| 2022/0232189 A1* | 7/2022 | Swierk | H04N 9/73 |

FOREIGN PATENT DOCUMENTS

| | | |
|---|---|---|
| JP | 2011-244080 A | 12/2011 |
| JP | 2012-529831 A | 11/2012 |
| JP | 2019-205205 A | 11/2019 |

* cited by examiner

*Primary Examiner* — Melur Ramakrishnaiah
(74) *Attorney, Agent, or Firm* — Oliff PLC

(57) ABSTRACT

An information processing device includes a processor configured to change a control of a light source to illuminate a user according to an appearance of the user in an online conference.

19 Claims, 4 Drawing Sheets

INFORMATION PROCESSING DEVICE, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2021-008929 filed Jan. 22, 2021.

BACKGROUND

(i) Technical Field

The present disclosure relates to an information processing device, an information processing method, and a non-transitory computer readable medium.

(ii) Related Art

Japanese Unexamined Patent Application Publication No. 2011-244080 describes a technology that acquires a video of a subject and outputs video data, acquires sound and outputs audio data, transmits and receives video data and audio data over a network, displays received video data, outputs received audio data, and controls a device that illuminates a subject with a light source.

Japanese Translation of PCT International Application Publication No. 2012-529831 describes a device that analyzes image data to detect the existence of multiple subjects in a scene, and for each subject not in the range of a light source from among the detected subjects, displays an indicator indicating that the subject is not in the range of the light source.

Japanese Unexamined Patent Application Publication No. 2019-205205 describes an image processing device that acquires a color image obtained by capturing a subject, specifies the region of the subject's face in the color image as a face region, and generates a modified image in which the brightness of at least a portion of the face region in the color image is modified.

SUMMARY

Aspects of non-limiting embodiments of the present disclosure relate to reducing the correction workload on a user compared to the case where the user manually corrects the appearance of the user in an online conference.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an information processing device including a processor configured to change a control of a light source to illuminate a user according to an appearance of the user in an online conference.

BRIEF DESCRIPTION OF THE DRAWINGS

An exemplary embodiment of the present disclosure will be described in detail based on the following figures, wherein.

DETAILED DESCRIPTION

Figure 1:
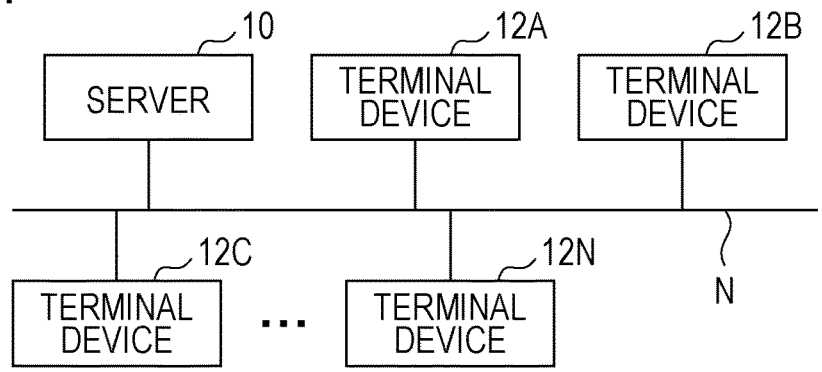
FIG. 1 is a block diagram illustrating a configuration of an information processing system according to an exemplary embodiment.

An information processing system according to the exemplary embodiment will be described with reference to FIG. 1. FIG. 1 illustrates an example of the configuration of the information processing system according to the exemplary embodiment.

The information processing system according to the exemplary embodiment includes a server 10 and N terminal devices (where N is an integer equal to or greater than 1), for example. In the example illustrated in FIG. 1, the information processing system according to the exemplary embodiment includes terminal devices 12A, 12B, 12C, . . . , 12N. The number of terminal devices illustrated in FIG. 1 is merely an example, and it is sufficient for the information processing system according to the exemplary embodiment to include one or multiple terminal devices. Hereinafter, the terminal devices 12A, 12B, 12C, . . . , 12N will be referred to as the "terminal device(s) 12" when not being individually distinguished. The information processing system according to the exemplary embodiment may also include other devices besides the server 10 and the terminal devices 12.

The server 10 and the terminal devices 12 have a function of communicating with other devices. The communication may be wired communication using a cable, or wireless communication. In other words, each device may transmit and receive information through a physical connection to other devices using a cable, or transmit and receive information through wireless communication. The wireless communication is a technology such as short-range wireless communication or Wi-Fi (registered trademark), for example. The short-range wireless communication is a technology such as Bluetooth (registered trademark), radio-frequency identifier (RFID), or NFC, for example. For example, each device may communicate with other devices through a communication channel N such as a local area network (LAN) or the Internet.

The server 10 provides an online service through the communication channel N. A user is able to use the online service using one of the terminal devices 12. For example, by using the online service, the user is able to convey information such as sounds, images, videos, text, and vibrations to one or more peers.

For example, the online service is an online conference, a service that provides content online, an online game, online shopping, a social networking service (SNS), or a combination of the above. An online conference may also be referred to as a web conference, a remote conference, or a video conference. The content may be entertainment (such as a concert, a theatrical performance, a movie, a video, or music, for example), sports, or esports, for example. For example, a video delivery service and a music delivery service are examples of the service that provides content online. The user is able to enjoy entertainment, watch sports or esports, and the like online.

The online service may be a service that uses a virtual space or a service that does not use a virtual space. A virtual space is a concept used in contrast to a real space, and refers to a virtual space achieved by a computer, a virtual space formed on a network such as the Internet, a virtual space achieved by virtual reality (VR) technology, or cyberspace, for example. For example, a virtual three-dimensional space or two-dimensional space corresponds to an example of a virtual space.

Additionally, the server 10 stores and manages account information for users who use the online service. The account information is information for logging in and using the online service, and includes a user ID and a password, for example. For example, by transmitting account information to the server 10 to log in to the online service, the user associated with the account information is allowed to participate in the online service and use the online service. Obviously, a user may also be able to use the online service without registering his or her own account information with the online service. Also, the user may be able to use the online service without logging in to the online service. Note that the server 10 may also provide different services depending on whether a user logs in or not.

Each terminal device 12 is a personal computer (hereinafter referred to as a "PC"), a tablet PC, a smartphone, a wearable device (such as augmented reality (AR) glasses, virtual reality (VR) glasses, or a bearable device), or a mobile phone, for example.

Note that an automatic response agent such as a chatbot may also participate in the online service. For example, the automatic response agent functions as a virtual assistant that responds to user queries, and is configured to receive the content of a statement by a user, analyze the content of the statement, create an answer or the like in response to the statement, and notify the user of the created answer. The automatic response agent is achieved by executing a program, for example. The program is stored in for example the server 10 or another device (such as another server or the terminal device 12, for example). The automatic response agent may be achieved through artificial intelligence (AI). An algorithm of any type may be used for the artificial intelligence.

The following assumes an example in which an online conference is used by a user, and information such as sounds, images, videos, text, and vibrations is conveyed to one or more communication peers through the online conference.

Figure 2:
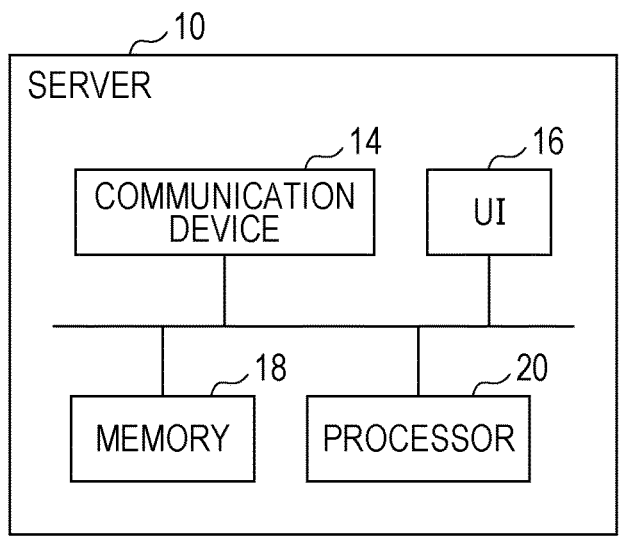
FIG. 2 is a block diagram illustrating a configuration of a server according to the exemplary embodiment.

Hereinafter, FIG. 2 will be referenced to describe a hardware configuration of the server 10. FIG. 2 illustrates an example of a hardware configuration of the server 10.

The server 10 includes a communication device 14, a user interface (UI) 16, a memory 18, and a processor 20, for example.

The communication device 14 is a communication interface including components such as a communication chip and a communication circuit, and has a function of transmitting information to another device and a function of receiving information from another device. The communication device 14 may have a wireless communication function, and may also have a wired communication function. The communication device 14 may communicate with another device by using short-range wireless communication for example, or communicate with another device through the communication channel N.

The UI 16 is a user interface, and includes at least one of a display or an input device. The display is a liquid crystal display (LCD), an electroluminescence (OLED) display, or the like. The input device is a device such as a keyboard, a mouse, input keys, or a control panel. The UI 16 may also be a UI such as a touch panel combining a display with an input device.

The memory 18 is a device that establishes one or multiple storage areas that store various types of information. For example, the memory 18 is a hard disk drive, any of various types of memory (such as RAM, DRAM, or ROM, for example), another type of storage device (such as an optical disc, for example), or a combination of the above. One or multiple memories 18 are included in the server 10.

The processor 20 is configured to control the operation of each unit of the server 10. The processor 20 may include a memory. For example, the processor 20 provides an online service to users.

Figure 3:
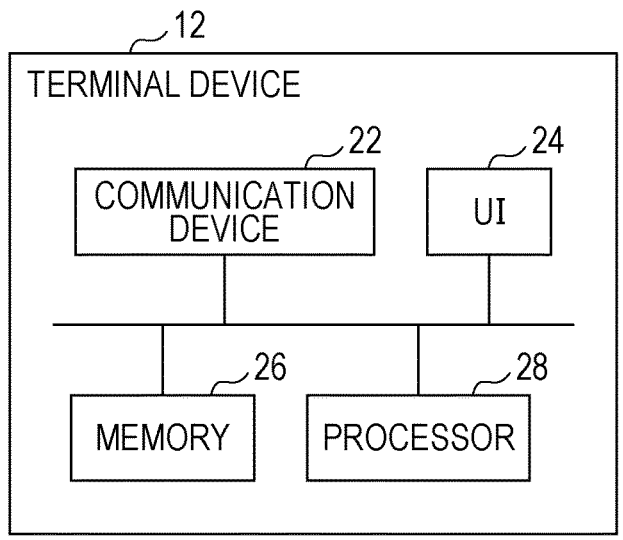
FIG. 3 is a block diagram illustrating a configuration of a terminal device according to the exemplary embodiment.

Hereinafter, FIG. 3 will be referenced to describe a hardware configuration of each terminal device 12. FIG. 3 illustrates an example of the hardware configuration of each terminal device 12.

Each terminal device 12 includes a communication device 22, a UI 24, a memory 26, and a processor 28, for example.

The communication device 22 is a communication interface including components such as a communication chip and a communication circuit, and has a function of transmitting information to another device and a function of receiving information transmitted from another device. The communication device 22 may have a wireless communication function, and may also have a wired communication function. The communication device 22 may communicate with another device by using short-range wireless communication for example, or communicate with another device through the communication channel N.

The UI 24 is a user interface, and includes at least one of a display or an input device. The display is a liquid crystal display (LCD), an electroluminescence (OLED) display, or the like. The input device is a device such as a keyboard, a mouse, input keys, or a control panel. The UI 24 may also be a UI such as a touch panel combining a display with an input device.

Additionally, each terminal device 12 may also include an imaging device such as a camera, a microphone, and a speaker, or some or all of these devices may be connected to each terminal device 12. Furthermore, earphones or headphones may also be connected to each terminal device 12.

The memory 26 is a device that establishes one or multiple storage areas that stores various types of information. For example, the memory 26 is a hard disk drive, any of various types of memory (such as RAM, DRAM, and ROM, for example), another type of storage device (such as an optical disc, for example), or a combination of the above. One or multiple memories 26 are included in each terminal device 12.

The processor 28 is configured to control the operation of each component of each terminal device 12. The processor 28 may also include a memory.

For example, the processor 28 causes a display of each terminal device 12 to display information such as images, videos, and text transmitted through an online conference, cause a speaker to produce sounds transmitted through the online conference, transmit information such as images and videos generated through image acquisition by the camera to one or more peers through the online conference, and transmit sounds picked up by a microphone to one or more peers through the online conference.

The terminal device 12 may also include at least one of various types of sensors such as a sensor that acquires position information about the terminal device 12 (such as a Global Positioning System (GPS) sensor for example), a gyro sensor that detects bearing and attitude, and an acceleration sensor.

Hereinafter, Examples of the exemplary embodiment will be described. The processor 20 of the server 10 or the processor 28 of the terminal device 12 may execute the processes according to each Example, or the processor 20 and the processor 28 may cooperate to execute the processes according to each Example. One portion of the processes may be executed by the processor 20 while another portion of the processes may be executed by the processor 28. Note that the server 10, the terminal device(s) 12, or a combination of both corresponds to one example of an information processing device according to the exemplary embodiment.

The following gives an example of the online service in which an online conference is used by a user, and information such as sounds, images, videos, text, and signals are transmitted to one or more communication peers through the online conference.

In the exemplary embodiment, a light source that illuminates a user participating in the online conference is used, and the control of the light source is changed according to the appearance of the user in the online conference.

The appearance of the user is determined by, for example, brightness, shadows, contrast, color, blown-out highlights (that is, an overly strong light causing the brightness to exceed a threshold value), backlight, the appearance of glasses (for example, light reflections off the lenses of glasses), or at least two of the above elements. Obviously, the appearance of the user may also be determined on the basis of elements other than the above.

For example, the appearance of the user may be the appearance of the user's full body or the appearance of an upper body region of the user. The upper body region of the user may be the region above the user's shoulders, the region above the user's neck, or the region of the user's face, for example. The region of the user's face may be the user's face itself without wearing an object such as a mask, or the user's face in a state of waring an object such as a mask, for example.

For example, the appearance of the user is determined by capturing the user with a camera and applying image processing to an image or video generated by the image capture to analyze the image or video. The appearance of the user may be determined by the processor 20 of the server 10 or by the processor 28 of one of the terminal devices 12 (for example, the terminal device 12 that the user uses).

The light source may be a light source preinstalled in a place used for the online conference, or a light source carried by the user who participates in the online conference. The light source carried by the user may be a light source installed in the terminal device 12 or a light source carried by the user without being installed in the terminal device 12, for example.

The characteristics and properties of the light source, such as the type, shape, size, intensity, and color of the light source are not particularly limited. For example, the light source is a fluorescent light, a light-emitting diode (LED), an incandescent light bulb, an arc lamp, a high-intensity discharge (HID) lamp, an electroluminescent light, a laser, a lamp, or a combination of at least two of the above. Also, by installing any of various types of filters such as a color filter on the light source directly or at a position distanced from the light source, properties such as the color, brightness, and shadowing of the light may be changed.

The light source may be controlled by the processor 20 of the server 10 or by the processor 28 of the terminal device 12. For example, settings of the light source are changed according to the appearance of the user. The settings of the light source include, for example, the type, number, intensity, color, direction, angle, position, or wavelength of the light source, or at least two of the above elements.

Hereinafter, as an example, users A, B, C, and D participate in the same online conference. The user A uses the terminal device 12A to log in to and participate in the online conference. The user B uses the terminal device 12B to log in to and participate in the online conference. The user C uses the terminal device 12C to log in to and participate in the online conference. The user D uses the terminal device 12D to log in to and participate in the online conference.

The multiple users may also use the same terminal device 12 to respectively log in to the online conference and participate in the online conference. The users are not able to participate in the online conference without logging into the online conference.

A user or administrator having rights may also allow or disallow the participation of each user in the online conference. In this case, users allowed to participate are able to participate in the online conference. A user may also invite another user to the online conference, and if the other uses expresses an intention to participate, the other user may be allowed to participate in the online conference.

A screen for the online conference is displayed on the display of each of the terminal devices 12A, 12B, 12C, and 12D. Each user who participates in the online conference is assigned a display area formed on the screen for the online conference, and in each display area, an image or video generated through image capture by a camera associated with the display area or an image or video figuratively representing the user assigned to each display area (such as an icon or an avatar, for example) is displayed. A character string for identifying each user (such as a name, a user ID, an account, or a nickname, for example) may also be displayed together with or instead of an image or video.

A display area assigned to the user A, a display area assigned to the user B, a display area assigned to the user C, and a display area assigned to the user D are displayed on the screen for the online conference.

Note that in the case where a display is installed in a place used for the online conference, the display may be connected to the terminal device 12, and the screen for the online conference may be displayed on the display.

The place used for the online conference is not particularly limited, and may be an enclosed space (such as a room, a booth, a conference room, or some other indoor space, for example) or an open space (such as a public square, a park, an athletic field, or some other outdoor space, for example).

Figure 4:
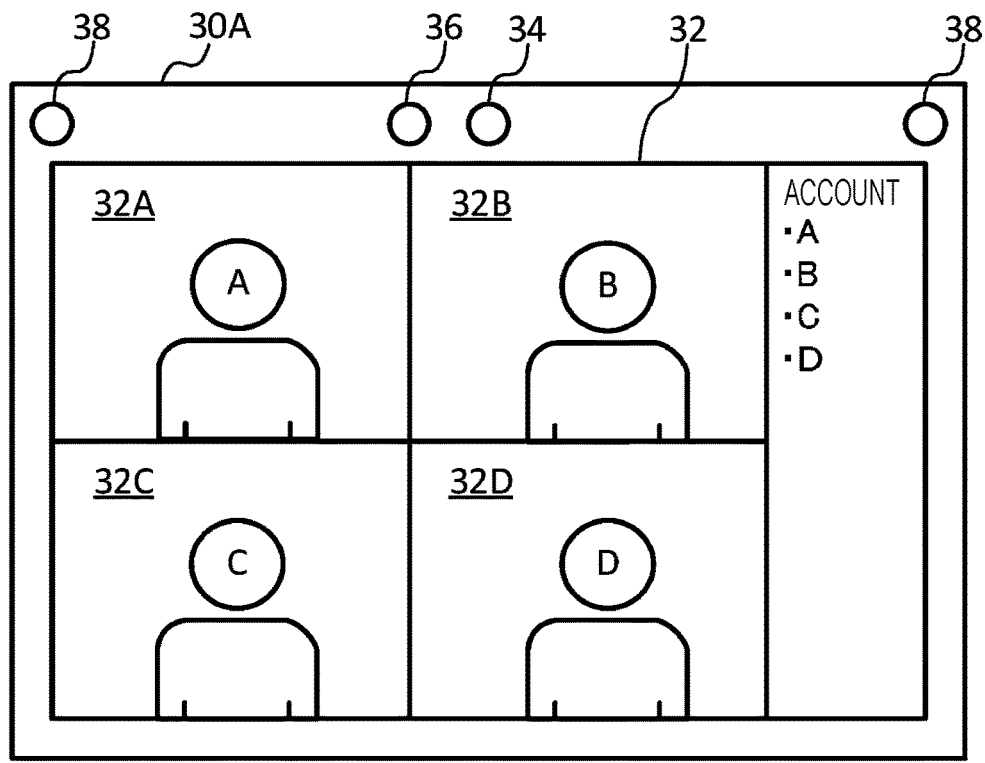
FIG. 4 is a diagram illustrating a screen.

FIG. 4 illustrates a screen 32 displayed on a display 30A. The display 30A is the display of the terminal device 12A of the user A. A screen similar to the screen 32 is also displayed on the respective displays of the terminal devices 12B, 12C, and 12D.

For example, display areas corresponding to the number of users participating in the online conference are formed on the screen 32. In the example illustrated in FIG. 4, display areas 32A, 32B, 32C, and 32D are formed on the screen 32. The display area 32A is assigned to the user A, the display area 32B is assigned to the user B, the display area 32c is assigned to the user C, and the display area 32D is assigned to the user D.

The size of each display area may be changed by the user or may be changed depending on whether or not each user is speaking. For example, the display area of a user who is speaking may increase in size, while the display areas of users who are not speaking may decrease in size.

Additionally, information for identifying each user participating in the online conference (such as account information, a name, or an ID, for example) may also be displayed on the screen 32. In the example illustrated in FIG. 4, account information for each of the users A, B, C, and D is displayed.

In the example illustrated in FIG. 4, a camera 34, a microphone 36, and a speaker 38 are installed in the display 30A. The camera 34 may be a camera referred to as an inward-facing camera or a front camera. The locations where the camera 34, the microphone 36, and the speaker 38 are installed are not limited to the display 30A, and may also be locations other than the display 30A in the terminal device 12A. Some or all of the camera 34, the microphone 36, and the speaker 38 may be installed in the terminal device 12A (for example, some or all may be built into the terminal device 12A), or some or all may be installed near the terminal device 12A and connected to the terminal device 12A without being installed in the terminal device 12A (for example, some or all may not be built into the terminal device 12A). Multiple cameras 34, multiple microphones 36, and multiple speakers 38 may also be connected to the terminal device 12A. Also, a microphone may be worn by the user A, and the user A may also wear earphones or headphones. In the case where the terminal device 12A is a wearable device such as AR glasses or VR glasses, a microphone and a speaker may also be installed in the wearable device.

Hereinafter, for convenience, the camera 34 installed in the terminal device 12A (that is, a built-in camera) and a camera not installed in the terminal device 12A but connected to the terminal device 12A (that is, an externally attached camera) will be referred to as the camera of the terminal device 12A. In other words, the conceptual category of a camera of the terminal device 12A includes not only the camera 34 installed in the terminal device 12A, but also a camera not installed in the terminal device 12A but connected to the terminal device 12A. The same applies to the terminal devices 12B, 12C, and 12D, and the conceptual category of a camera of each of the terminal devices 12B, 12C, and 12D includes a built-in camera and an externally attached camera.

Similarly, the microphone 36 installed in the terminal device 12A (that is, a built-in microphone) and a microphone not installed in the terminal device 12A but connected to the terminal device 12A (that is, an externally attached microphone) will be referred to as the microphone of the terminal device 12A. In other words, the conceptual category of a microphone of the terminal device 12A includes not only the microphone 36 installed in the terminal device 12A, but also a microphone not installed in the terminal device 12A but connected to the terminal device 12A. The same applies to the terminal devices 12B, 12C, and 12D, and the conceptual category of a microphone of each of the terminal devices 12B, 12C, and 12D includes a built-in microphone and an externally attached microphone.

Similarly, the speaker 38 installed in the terminal device 12A (that is, a built-in speaker) and a speaker not installed in the terminal device 12A but connected to the terminal device 12A (that is, an externally connected speaker) will be referred to as the speaker of the terminal device 12A. In other words, the conceptual category of a speaker of the terminal device 12A includes not only the speaker 38 installed in the terminal device 12A, but also a speaker not installed in the terminal device 12A but connected to the terminal device 12A. The same applies to the terminal devices 12B, 12C, and 12D, and the conceptual category of a speaker of each of the terminal devices 12B, 12C, and 12D includes a built-in speaker and an externally connected speaker.

For example, the camera of the terminal device 12A is associated with the user A, and an image or video generated through image capture by the camera of the terminal device 12A is displayed in the display area 32A assigned to the user A on the screen 32 for the online conference. The data of the image or video generated through image capture by the camera of the terminal device 12A is transmitted to each terminal device 12 through the terminal device 12A and the server 10, and displayed in the display area 32A on the screen 32 for the online conference on the display of each terminal device 12. For example, the user is captured by a camera carried by the user A (for example, a camera built into the terminal device 12A (a smartphone camera for example) carried by the user), and the image or video generated by the capture is displayed in the display area 32A. Obviously, the user may also be captured by an externally attached camera, and the image or video generated by the image capture may be displayed in the display area 32A. Note that an image or video that figuratively represents the user A or a character string for identifying the user A may also be displayed instead of an image or video generated through image capture by a camera.

The same applies to the users B, C, and D. An image or video generated through image capture by the camera of the terminal device 12B is displayed in the display area 32B assigned to the user B. An image or video generated through image capture by the camera of the terminal device 12C is displayed in the display area 32C assigned to the user C. An image or video generated through image capture by the camera of the terminal device 12D is displayed in the display area 32D assigned to the user D. An image or video that figuratively represents a user or a character string for identifying a user may also be displayed instead of an image or video generated through image capture by a camera.

Note that images or videos of all users participating in the online conference may be displayed, or images or videos of a subset of the users may be displayed. The display or non-display or an image or video may also be specified the user.

When sounds are picked up by the microphone of the terminal device 12A, data of the picked-up sound is transmitted from the terminal device 12A to the terminal devices 12B, 12C and 12D through the server 10, and the sound is emitted from the respective speakers of the terminal devices 12B, 12C, and 12D. Similarly, when sounds are picked up by the respective microphones of the terminal devices 12B, 12C, and 12D, the picked-up sounds are emitted from the speakers of the other terminal devices 12. User speech may also be displayed as a character string.

Through the online conference, each user is able to exchange information such as sounds, images, videos, and text with other users.

Hereinafter, processes according to the exemplary embodiment will be described with focus on the user A, but similar processes are also performed with respect to the users B, C, and D.

Figure 5:
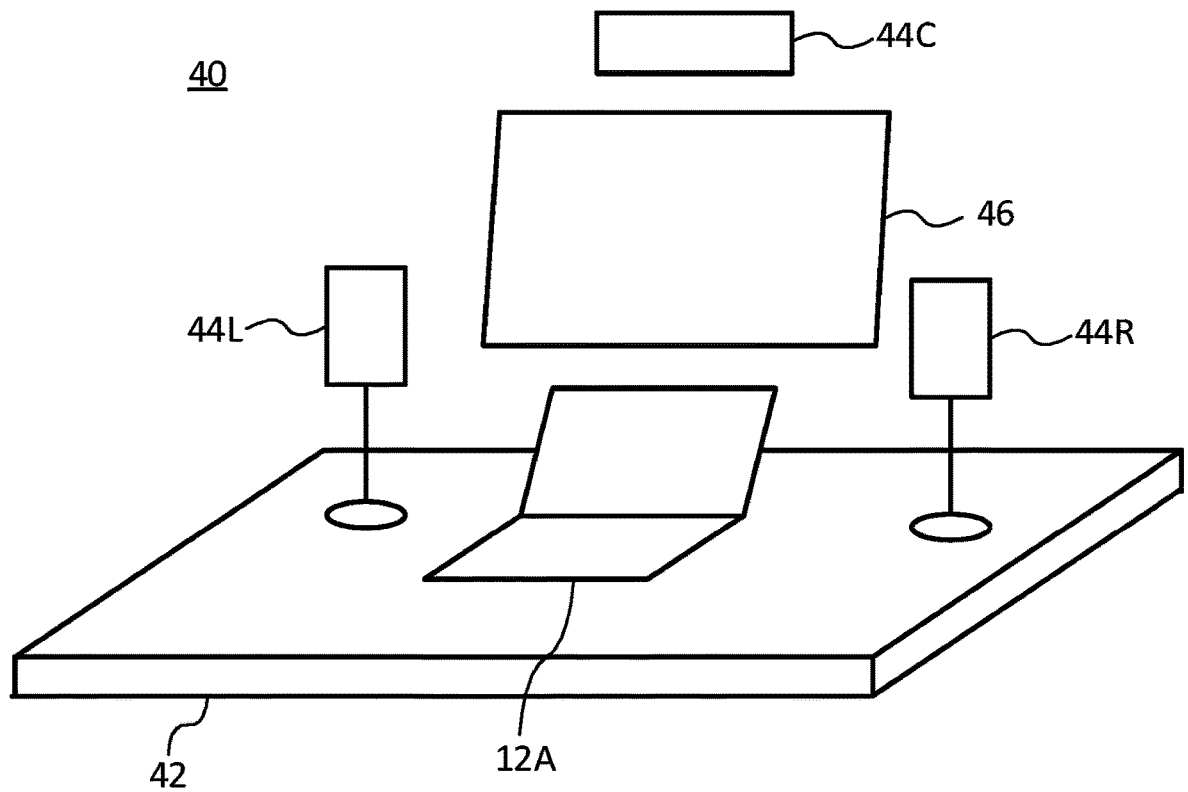
FIG. 5 is a diagram illustrating a terminal device and the like installed in a place.

FIG. 5 illustrates the terminal device 12A and the like installed in a place 40. The place 40 is a place used by the user A. The user participates in the online conference at the place 40. The place 40 is a partitioned space, such as a booth or a room, for example.

A table 42 and a chair are installed in the place 40, for example. The chair is not illustrated. On the table 42, the terminal device 12A (a notebook PC, for example), light sources 44R and 44L, and a display 46 are installed. The light source 44R is installed on the right side of the terminal device 12A from the perspective of the user A, while the light source 44L is installed on the left side of the terminal device 12A from the perspective of the user A. Also, a light source 44C is installed on a wall at a position between the light source 44R and the light source 44L. The terminal device 12A may be a device that the user A brings into the place 40, or a device preinstalled in the place 40. In other words, the user A may bring in his or her own terminal device 12A to use in the place 40, or the user A may use a terminal device 12A already installed in the place 40.

Figure 6:
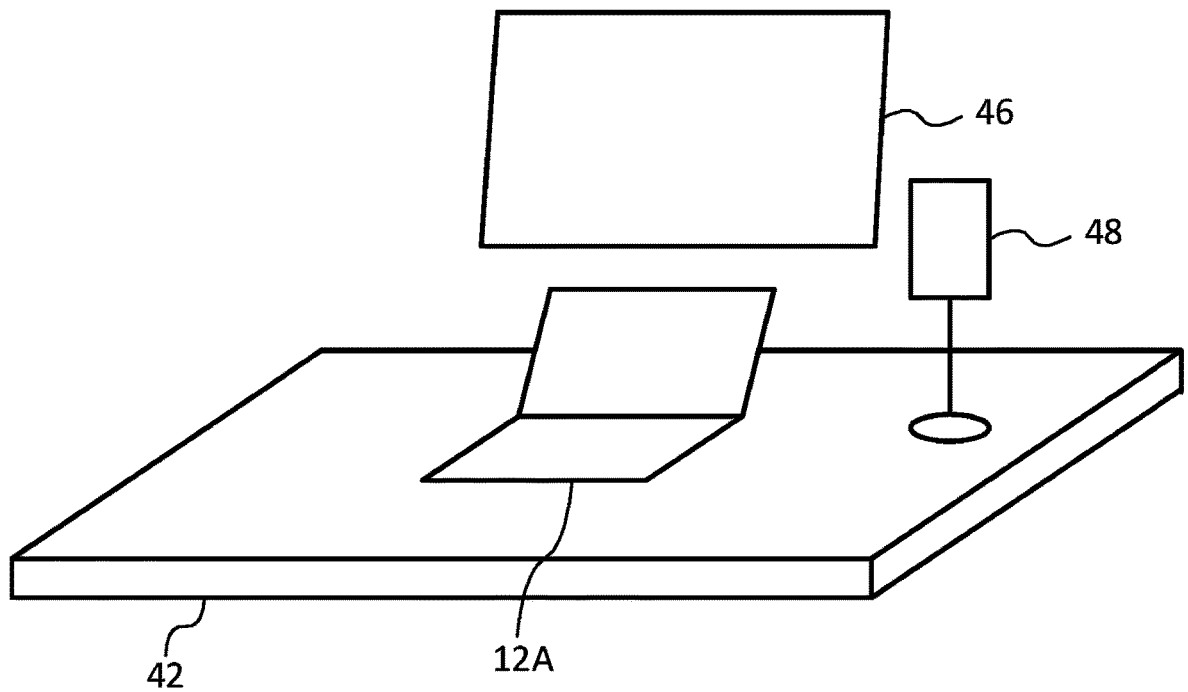
FIG. 6 is a diagram illustrating a terminal device and the like installed in a place.

The number, installation positions, directions, and types of light sources illustrated in FIG. 5 are merely one example. For example, as illustrated in FIG. 6, a single light source 48 may also be installed on one side (for example, the right side) of the terminal device 12A. Additionally, a light source may be installed in a location such as the ceiling, wall, or floor of the place 40. Note that features such as the type, shape, and size of the light sources 44R, 44L, and 44C may be the same or different from each other.

Figure 7:
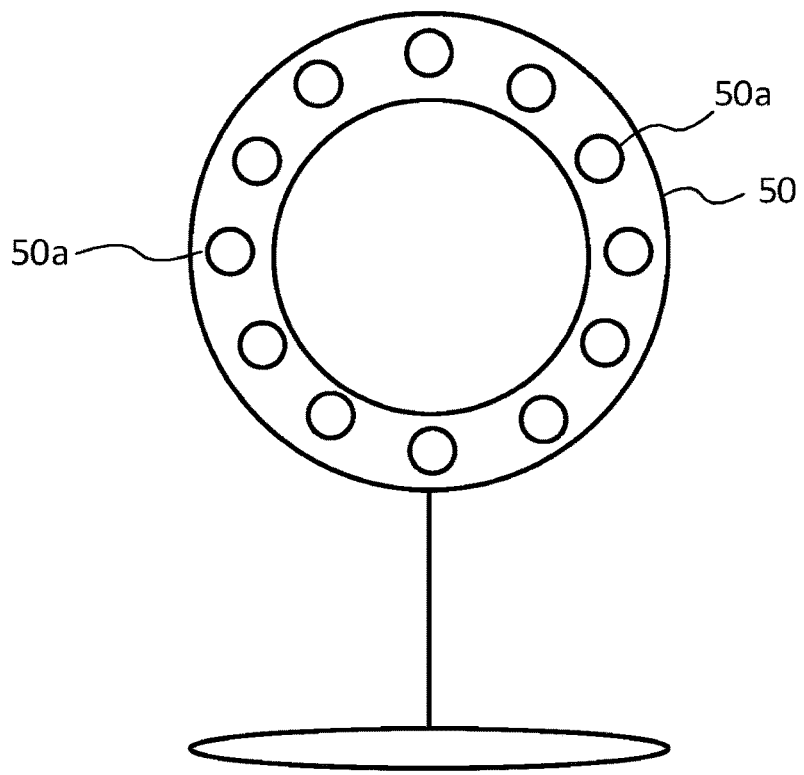
FIG. 7 is a diagram illustrating a light source.

The light sources illustrated in FIGS. 5 and 6 are rod-shaped light sources or rectangular light sources, but this is merely one example. As illustrated in FIG. 7, a light source 50 in which multiple light sources 50a are arranged in a ring may also be used. As another example, a substantially spherical light source may also be used. In this way, properties such as the shape and size of the light source are not limited.

Each light source may be preinstalled in the place 40 or brought to the place 40 by the user A. Each light source may also be a light source carried by the user A.

Each light source inside the place 40 is controlled according to the appearance of the user A in the online conference. For example, the light sources 44R, 44L, and 44C are controlled according to the appearance of the user A. Some or all of the light sources 44R, 44L, and 44C may be connected to the terminal device 12A and controlled by the processor 28 of the terminal device 12A, or connected to the server 10 and controlled by the processor 20 of the server 10. For example, a light source connected to the terminal device 12A may be controlled by the processor 28 of the terminal device 12A, while a light source installed in the place 40 without being connected to the terminal device 12A may be controlled by the processor 20 of the server 10.

In the following, the light sources 44R, 44L, and 44C are controlled by the processor 28 of the terminal device 12A as an example. Note that each light source to be controlled according to the appearance of the user A may also be specified by the user A. For example, if the light sources 44R and 44L are specified by the user A as light sources to be controlled, the light sources 44R and 44L are controlled according to the appearance of the user A. Note that the settings of each light source may also be changed by the user. For example, the settings of each light source may be adjusted by the user.

The processor 28 of the terminal device 12A changes the control of the light sources 44R, 44L, and 44C illuminating the user A according to the appearance of the user A in the online conference. In other words, the processor 28 of the terminal device 12A changes the settings of the light sources 44R, 44L, and 44C (for example, the type, number, intensity, color, direction, angle, position, or wavelength of the light source, or at least two of the above elements) according to the appearance of the user in the online conference. Hereinafter, Examples will be described in detail.

Example 1

In Example 1, the processor 28 of the terminal device 12A controls the intensity of at least one of the light sources 44R, 44L, or 44C according to the appearance of the user A.

For example, the face region of the user A is captured by the camera of the terminal device 12A, and the processor 28 of the terminal device 12A detects the brightness of the face region of the user A by analyzing an image or video generated by the capture. A known image processing technology may be used for the analysis. In the case where the detected brightness is included in a predetermined brightness tolerance range, the processor 28 of the terminal device 12A does not change the intensity of the light sources 44R, 44L, and 44C. In the case where the detected brightness is not included in the brightness tolerance range, the processor 28 of the terminal device 12A changes the intensity of at least one of the light sources 44R, 44L, or 44C such that the brightness of the face region of the user A is included in the tolerance range. For example, the processor 28 of the terminal device 12A changes the intensity of at least one of the light sources 44R, 44L, or 44C such that the entire face region of the user A is brighter. The processor 28 of the terminal device 12A may set the intensity of the light sources 44R, 44L, and 44C to the same intensity or to respectively different intensities. For example, an ideal brightness is predetermined, and the tolerance range is set with reference to the ideal brightness. The brightness tolerance range may also be changed by the user.

The processor 28 of the terminal device 12A may detect the brightness of a portion (for example, a specified spot) of the face region of the user A and change the intensity of each light source on the basis of the detected brightness, or detect the brightness of the entire face region of the user A and change the intensity of each light source on the basis of the detected brightness.

The processor 28 of the terminal device 12A may also detect a brightness distribution of all or a portion of the face region of the user A, and change the intensity of each light source on the basis of the detected brightness distribution. For example, the processor 28 of the terminal device 12A may change the intensity of each light source such that all or a portion of the face region of the user A has a uniform brightness distribution.

The processor 28 of the terminal device 12A may also analyze an image or video of the face region of the user A to thereby detect whether or not a shadow is formed on all or a portion of the face region of the user A. In the case where a shadow is not detected, the processor 28 of the terminal device 12A does not change the intensity of the light sources 44R, 44L, and 44C. In the case where a shadow is detected, the processor 28 of the terminal device 12A changes the intensity of at least one of the light sources 44R, 44L, or 44C such that the shadow is no longer detected. The processor 28 of the terminal device 12A may change the intensity of at least one of the light sources 44R, 44L, or 44C such that a shadow is no longer detected and also such that the brightness of the face region of the user A is included in the tolerance range.

The processor 28 of the terminal device 12A may also detect a shadow distribution of all or a portion of the face region of the user A, and change the intensity of each light source on the basis of the detected shadow distribution. For example, the processor 28 of the terminal device 12A may change the intensity of each light source such that all or a portion of the face region of the user A has a uniform shadow distribution.

The processor 28 of the terminal device 12A may also analyze an image or video of the face region of the user A to thereby detect the contrast of the face region of the user A. In the case where the detected contrast is included in a predetermined contrast tolerance range, the processor 28 of the terminal device 12A does not change the intensity of the light sources 44R, 44L, and 44C. In the case where the detected contrast is not included in the contrast tolerance range, the processor 28 of the terminal device 12A changes the intensity of at least one of the light sources 44R, 44L, or 44C such that the contrast of the face region of the user A is included in the tolerance range. For example, an ideal contrast is predetermined, and the tolerance range is set with reference to the ideal contrast. The contrast tolerance range may also be changed by the user.

The processor 28 of the terminal device 12A may detect the contrast of a portion of the face region of the user A and change the intensity of each light source on the basis of the detected contrast, or detect the contrast of the entire face region of the user A and change the intensity of each light source on the basis of the detected contrast.

The processor 28 of the terminal device 12A may also analyze an image or video of the face region of the user A to thereby detect the color of the face region of the user A. In the case where the detected color is included in a predetermined color tolerance range, the processor 28 of the terminal device 12A does not change the intensity of the light sources 44R, 44L, and 44C. In the case where the detected color is not included in the tolerance range, the processor 28 of the terminal device 12A changes the intensity of at least one of the light sources 44R, 44L, or 44C such that the color of the face region of the user A is included in the tolerance range. For example, an ideal color is predetermined, and the tolerance range is set with reference to the ideal color. The color tolerance range may also be changed by the user.

The processor 28 of the terminal device 12A may detect the color of a portion of the face region of the user A and change the intensity of each light source on the basis of the detected color, or detect the color of the entire face region of the user A and change the intensity of each light source on the basis of the detected color.

The processor 28 of the terminal device 12A may also detect a color distribution of all or a portion of the face region of the user A, and change the intensity of each light source on the basis of the detected color distribution. For example, the processor 28 of the terminal device 12A may change the intensity of each light source such that all or a portion of the face region of the user A has a uniform color distribution.

The processor 28 of the terminal device 12A may also analyze an image or video of the face region of the user A to thereby detect blown-out highlights in all or a portion of the face region of the user A. Blown-out highlights refer to areas where the brightness exceeds a threshold value, and the processor 28 of the terminal device 12A detects whether or not the brightness of all or a portion of the face region of the user A exceeds the threshold value. In the case where blown-out highlights are not detected, the processor 28 of the terminal device 12A does not change the intensity of the light sources 44R, 44L, and 44C. In the case where blown-out highlights are detected, the processor 28 of the terminal device 12A changes the intensity of at least one of the light sources 44R, 44L, or 44C such that the blown-out highlights are no longer detected. The processor 28 of the terminal device 12A may change the intensity of at least one of the light sources 44R, 44L, or 44C such that blown-out highlights are no longer detected and also such that the brightness of the face region of the user A is included in the tolerance range.

The processor 28 of the terminal device 12A may also analyze an image or video of the face region of the user A to thereby detect the presence or absence of backlight. In the case where backlight is not detected, the processor 28 of the terminal device 12A does not change the intensity of the light sources 44R, 44L, and 44C. In the case where backlight is detected, the processor 28 of the terminal device 12A changes the intensity of at least one of the light sources 44R, 44L, or 44C. For example, the processor 28 of the terminal device 12A raises the intensity of at least one of the light sources 44R, 44L, or 44C (that is, makes the light source brighter).

In the case where the user A is wearing glasses, the processor 28 of the terminal device 12A may analyze an image or video of the face region of the user A to thereby detect glare on the glasses (for example, the presence or absence of light reflections off the lenses of the glasses). For example, in the case where light reflections off the lenses are not detected, the processor 28 of the terminal device 12A does not change the intensity of the light sources 44R, 44L, and 44C. In the case where light reflections off the lenses are detected, the processor 28 of the terminal device 12A changes the intensity of at least one of the light sources 44R, 44L, or 44C such that the light reflections off the lenses are no longer detected. In the case where the amount of light reflections off the lenses (for example, the brightness of the reflected light) exceeds a threshold value, the processor 28 of the terminal device 12A may change the intensity of at least one of the light sources 44R, 44L, or 44C such that the amount of light reflections off the lenses is the threshold value or less.

The processor 28 of the terminal device 12A may also change the intensity of at least one of the light sources 44R, 44L, or 44C on the basis of at least two elements from among the brightness, the presence or absence of shadows, the contrast, the color, the presence or absence of blown-out highlights, the presence or absence of backlight, and the presence or absence of glare on glasses in the face region of the user A. For example, the processor 28 of the terminal device 12A may change the intensity of the light sources 44R, 44L, and 44C such that the brightness of the face region of the user A is included in the brightness tolerance range and also such that the color of the face region of the user A is included in the color tolerance range.

The processor 28 of the terminal device 12A may also change the control of the light sources 44R, 44L, and 44C according to a change in the position of the user A. In Example 1, the processor 28 of the terminal device 12A may change the intensity of at least one of the light sources 44R, 44L, or 44C according to the position of the user A.

For example, the processor 28 of the terminal device 12A may detect the position of a device carried by the user A (such as a smartphone or a wearable device) as the position of the user A by using GPS, or detect the position of the user A by capturing the user A with the camera of the terminal device 12A.

For example, in the case where the position of the user A changes, the processor 28 of the terminal device 12A changes the intensity of at least one of the light sources 44R, 44L, or 44C such that the brightness and color of the face region of the user A does not change. Also, in the case where the position of the user A changes, the processor 28 of the terminal device 12A changes the intensity of at least one of the light sources 44R, 44L, or 44C such that shadows, blown-out highlights, or glare on glasses does not occur.

The processor 28 of the terminal device 12A may also notify the user A according to the appearance of the user A to encourage the user A to correct his or her appearance. For example, the processor 28 of the terminal device 12A may cause the display of the terminal device 12A to display a message indicating the above encouragement, cause the speaker of the terminal device 12A to emit sounds indicating the above encouragement, or communicate the encouragement to the user A through vibration.

For example, the processor 28 of the terminal device 12A may issue a notification to the user A prompting the user A to change the intensity of at least one of the light sources 44R, 44L, or 44C according to the appearance of the user A. The user A receiving the notification may manually change the intensity of at least one of the light sources 44R, 44L, or 44C. The processor 28 of the terminal device 12A receives the change of intensity performed by the user A, and changes the intensity of the light source(s). In the case of encouraging the user to change the intensity, the processor 28 of the terminal device 12A does not have to change the intensity of the light source(s) automatically.

Note that the processor 20 of the server 10 may also execute the processes according to Example 1.

Example 2

In Example 2, the processor 28 of the terminal device 12A changes the positional relationship between at least one of the light sources 44R, 44L, or 44C and the user A according to the appearance of the user A.

The processor 28 of the terminal device 12A changes the positional relationship between the light source(s) and the user A by changing the position of at least one of the light source(s) or the user A.

In the case where at least one of the light sources 44R, 44L, or 44C is a light source whose installation location is changeable automatically, the processor 28 of the terminal device 12A may change the positional relationship between the light source(s) and the user A by changing the installation location of the light source(s). In the case where the user is sitting in a chair and the installation location of the chair is changeable automatically, the processor 28 of the terminal device 12A may change the positional relationship between the light source(s) and the user A by changing the installation location of the chair.

The light source(s) or the chair may be movable along a rail, or tires may be attached to the light source(s) or the chair, and the light source(s) or the chair may be moved by causing the tires to rotate. For example, by using and controlling a member such as a motor, the light source(s) or the chair may be moved to change the installation location of each.

For example, the processor 28 of the terminal device 12A analyzes an image or video of the face region of the user A to thereby detect the brightness of the face region of the user A. In the case where the detected brightness is included in a predetermined brightness tolerance range, the processor 28 of the terminal device 12A does not change the positional relationship between the light sources 44R, 44L, 44C and the user A. In the case where the detected brightness is not included in the brightness tolerance range, the processor 28 of the terminal device 12A changes the positional relationship between the light sources 44R, 44L, 44C and the user A by changing the position of at least one of the light sources 44R, 44L, 44C or the user A such that the brightness of the face region of the user A is included in the tolerance range. For example, the processor 28 of the terminal device 12A changes the positional relationship between the light sources 44R, 44L, 44C and the user A such that the entire face region of the user A is brighter.

The processor 28 of the terminal device 12A may detect the brightness of a portion (for example, a specified spot) of the face region of the user A and change the positional relationship between the light sources 44R, 44L, 44C and the user A on the basis of the detected brightness, or detect the brightness of the entire face region of the user A and change the positional relationship between the light sources 44R, 44L, 44C and the user A on the basis of the detected brightness.

The processor 28 of the terminal device 12A may also detect a brightness distribution of all or a portion of the face region of the user A, and change the positional relationship between the light sources 44R, 44L, 44C and the user A on the basis of the detected brightness distribution. For example, the processor 28 of the terminal device 12A may change the positional relationship between the light sources 44R, 44L, 44C and the user A such that all or a portion of the face region of the user A has a uniform brightness distribution.

The processor 28 of the terminal device 12A may also analyze an image or video of the face region of the user A to thereby detect whether or not a shadow is formed on all or a portion of the face region of the user A. In the case where a shadow is not detected, the processor 28 of the terminal device 12A does not change the positional relationship between the light sources 44R, 44L, 44C and the user A. In the case where a shadow is detected, the processor 28 of the terminal device 12A changes the positional relationship between the light sources 44R, 44L, 44C and the user A by changing the position of at least one of the light sources 44R, 44L, 44C or the user A such that the shadow is no longer detected. The processor 28 of the terminal device 12A may change the positional relationship between the light sources 44R, 44L, 44C and the user A such that a shadow is no longer detected and also such that the brightness of the face region of the user A is included in the tolerance range.

The processor 28 of the terminal device 12A may also detect a shadow distribution of all or a portion of the face region of the user A, and change the positional relationship between the light sources 44R, 44L, 44C and the user A on the basis of the detected shadow distribution. For example, the processor 28 of the terminal device 12A may change the positional relationship between the light sources 44R, 44L, 44C and the user A such that all or a portion of the face region of the user A has a uniform shadow distribution.

The processor 28 of the terminal device 12A may also analyze an image or video of the face region of the user A to thereby detect the contrast of the face region of the user A. In the case where the detected contrast is included in a predetermined contrast tolerance range, the processor 28 of the terminal device 12A does not change the positional relationship between the light sources 44R, 44L, 44C and the user A. In the case where the detected contrast is not included in the contrast tolerance range, the processor 28 of the terminal device 12A changes the positional relationship between the light sources 44R, 44L, 44C and the user A by changing the position of at least one of the light sources 44R, 44L, 44C or the user A such that the contrast of the face region of the user A is included in the tolerance range.

The processor 28 of the terminal device 12A may detect the contrast of a portion of the face region of the user A and change the positional relationship between the light sources 44R, 44L, 44C and the user A on the basis of the detected contrast, or detect the contrast of the entire face region of the user A and change the positional relationship between the light sources 44R, 44L, 44C and the user A on the basis of the detected contrast.

The processor 28 of the terminal device 12A may also analyze an image or video of the face region of the user A to thereby detect the color of the face region of the user A. In the case where the detected color is included in a predetermined color tolerance range, the processor 28 of the terminal device 12A does not change the positional relationship between the light sources 44R, 44L, 44C and the user A. In the case where the color of the face region of the user a is not included in the tolerance range, the processor 28 of the terminal device 12A changes the positional relationship between the light sources 44R, 44L, 44C and the user A by changing the position of at least one of the light sources 44R, 44L, 44C or the user A such that the color of the face region of the user A is included in the tolerance range.

The processor 28 of the terminal device 12A may detect the color of a portion of the face region of the user A and change the positional relationship between the light sources 44R, 44L, 44C and the user A on the basis of the detected color, or detect the color of the entire face region of the user A and change the positional relationship between the light sources 44R, 44L, 44C and the user A on the basis of the detected color.

The processor 28 of the terminal device 12A may also detect a color distribution of all or a portion of the face region of the user A, and change the positional relationship between the light sources 44R, 44L, 44C and the user A on the basis of the detected color distribution. For example, the processor 28 of the terminal device 12A may change the positional relationship between the light sources 44R, 44L, 44C and the user A such that all or a portion of the face region of the user A has a uniform color distribution.

The processor 28 of the terminal device 12A may also analyze an image or video of the face region of the user A to thereby detect blown-out highlights in all or a portion of the face region of the user A. In the case where blown-out highlights are not detected, the processor 28 of the terminal device 12A does not change the positional relationship between the light sources 44R, 44L, 44C and the user A. In the case where blown-out highlights are detected, the processor 28 of the terminal device 12A changes the positional relationship between the light sources 44R, 44L, 44C and the user A by changing the position of at least one of the light sources 44R, 44L, 44C or the user A such that the blown-out highlights are no longer detected. The processor 28 of the terminal device 12A may change the positional relationship between the light sources 44R, 44L, 44C and the user A such that blown-out highlights are no longer detected and also such that the brightness of the face region of the user A is included in the tolerance range.

The processor 28 of the terminal device 12A may also analyze an image or video of the face region of the user A to thereby detect the presence or absence of backlight. In the case where backlight is not detected, the processor 28 of the terminal device 12A does not change the positional relationship between the light sources 44R, 44L, 44C and the user A. In the case where backlight is detected, the processor 28 of the terminal device 12A changes the positional relationship between the light sources 44R, 44L, 44C and the user A by changing the position of at least one of the light sources 44R, 44L, 44C or the user A.

In the case where the user A is wearing glasses, the processor 28 of the terminal device 12A may analyze an image or video of the face region of the user A to thereby detect glare on the glasses (for example, the presence or absence of light reflections off the lenses of the glasses). For example, in the case where light reflections off the lenses are not detected, the processor 28 of the terminal device 12A does not change the positional relationship between the light sources 44R, 44L, 44C and the user A. In the case where light reflections off the lenses are detected, the processor 28 of the terminal device 12A changes the positional relationship between the light sources 44R, 44L, 44C and the user A by changing at least one of the light sources 44R, 44L, 44C or the user A such that the light reflections off the lenses are no longer detected. In the case where the amount of light reflections off the lenses (for example, the brightness of the reflected light) exceeds a threshold value, the processor 28 of the terminal device 12A may change the positional relationship between the light sources 44R, 44L, 44C and the user A such that the amount of light reflections off the lenses is the threshold value or less.

The processor 28 of the terminal device 12A may also change the positional relationship between the light sources 44R, 44L, 44C and the user A on the basis of at least two elements from among the brightness, the presence or absence of shadows, the contrast, the color, the presence or absence of blown-out highlights, the presence or absence of backlight, and the presence or absence of glare on glasses in the face region of the user A. For example, the processor 28 of the terminal device 12A may change the positional relationship between the light sources 44R, 44L, 44C and the user A such that the brightness of the face region of the user A is included in the brightness tolerance range and also such that the color of the face region of the user A is included in the color tolerance range.

The processor 28 of the terminal device 12A may also change the control of the light sources 44R, 44L, and 44C according to a change in the position of the user A. In Example 2, the processor 28 of the terminal device 12A may change the position of at least one of the light sources 44R, 44L, or 44C according to the position of the user A.

For example, in the case where the position of the user A changes, the processor 28 of the terminal device 12A may change the position of at least one of the light sources 44R, 44L, or 44C such that the brightness and color of the face region of the user A does not change. Also, in the case where the position of the user A changes, the processor 28 of the terminal device 12A changes the position of at least one of the light sources 44R, 44L, or 44C such that shadows, blown-out highlights, or glare on glasses does not occur. For example, the processor 28 of the terminal device 12A changes the position of the light source(s) to track the change in the position of the user A, such that the user A is illuminated by the light source(s).

The processor 28 of the terminal device 12A may also notify the user A according to the appearance of the user A to encourage the user A to correct his or her appearance. For example, the processor 28 of the terminal device 12A may cause the display of the terminal device 12A to display a message indicating the above encouragement, cause the speaker of the terminal device 12A to emit sounds indicating the above encouragement, or communicate the encouragement to the user A through vibration.

For example, the processor 28 of the terminal device 12A may issue a notification to the user A prompting the user A to change the position of at least one of the light sources 44R, 44L, 44C or the user A according to the appearance of the user A. The user A receiving the notification may manually change the position of at least one of the light sources 44R, 44L, 44C or the user A. In the case of encouraging the user to change the position, the processor 28 of the terminal device 12A does not have to change the position of the light source(s) or the user automatically.

Note that the processor 20 of the server 10 may also execute the processes according to Example 2.

Example 3

In Example 3, the processor 28 of the terminal device 12A changes the direction of at least one of the light sources 44R, 44L, or 44C with respect to the user A according to the appearance of the user A.

In the case where at least one of the light sources 44R, 44L, or 44C is a light source whose direction is changeable automatically, the processor 28 of the terminal device 12A may change the direction of the light source(s) with respect to the user A by changing the direction of the light source(s). In the case where the user is sitting in a chair and the direction of the chair is changeable automatically, the processor 28 of the terminal device 12A may change the direction of the light source(s) with respect to the user A by changing the direction of the chair.

For example, the processor 28 of the terminal device 12A analyzes an image or video of the face region of the user A to thereby detect the brightness of the face region of the user A. In the case where the detected brightness is included in a predetermined brightness tolerance range, the processor 28 of the terminal device 12A does not change the direction of the light sources 44R, 44L, and 44C with respect to the user A. In the case where the detected brightness is not included in the brightness tolerance range, the processor 28 of the terminal device 12A changes the direction of the light sources 44R, 44L, and 44C with respect to the user A by changing the direction of at least one of the light sources 44R, 44L, 44C or the user A such that the brightness of the face region of the user A is included in the tolerance range. For example, the processor 28 of the terminal device 12A changes the direction of the light sources 44R, 44L, and 44C with respect to the user A such that the entire face region of the user A is brighter.

The processor 28 of the terminal device 12A may detect the brightness of a portion (for example, a specified spot) of the face region of the user A and change the direction of the light sources 44R, 44L, and 44C with respect to the user A on the basis of the detected brightness, or detect the brightness of the entire face region of the user A and change the direction of the light sources 44R, 44L, and 44C with respect to the user A on the basis of the detected brightness.

The processor 28 of the terminal device 12A may also detect a brightness distribution of all or a portion of the face region of the user A, and change the direction of the light sources 44R, 44L, and 44C with respect to the user A on the basis of the detected brightness distribution. For example, the processor 28 of the terminal device 12A may change the direction of the light sources 44R, 44L, and 44C with respect to the user A such that all or a portion of the face region of the user A has a uniform brightness distribution.

The processor 28 of the terminal device 12A may also analyze an image or video of the face region of the user A to thereby detect whether or not a shadow is formed on all or a portion of the face region of the user A. In the case where a shadow is not detected, the processor 28 of the terminal device 12A does not change the direction of the light sources 44R, 44L, and 44C with respect to the user A. In the case where a shadow is detected, the processor 28 of the terminal device 12A changes the direction of the light sources 44R, 44L, and 44C with respect to the user A by changing the direction of at least one of the light sources 44R, 44L, 44C or the user A such that the shadow is no longer detected. The processor 28 of the terminal device 12A may change the direction of the light sources 44R, 44L, and 44C with respect to the user A such that a shadow is no longer detected and also such that the brightness of the face region of the user A is included in the tolerance range.

The processor 28 of the terminal device 12A may also detect a shadow distribution of all or a portion of the face region of the user A, and change the direction of the light sources 44R, 44L, and 44C with respect to the user A on the basis of the detected shadow distribution. For example, the processor 28 of the terminal device 12A may change the direction of the light sources 44R, 44L, and 44C with respect to the user A such that all or a portion of the face region of the user A has a uniform shadow distribution.

The processor 28 of the terminal device 12A may also analyze an image or video of the face region of the user A to thereby detect the contrast of the face region of the user A. In the case where the detected contrast is included in a predetermined contrast tolerance range, the processor 28 of the terminal device 12A does not change the direction of the light sources 44R, 44L, and 44C with respect to the user A. In the case where the detected contrast is not included in the contrast tolerance range, the processor 28 of the terminal device 12A changes the direction of the light sources 44R, 44L, and 44C with respect to the user A by changing the direction of at least one of the light sources 44R, 44L, 44C or the user A such that the contrast of the face region of the user A is included in the tolerance range.

The processor 28 of the terminal device 12A may detect the contrast of a portion of the face region of the user A and change the direction of the light sources 44R, 44L, and 44C with respect to the user A on the basis of the detected contrast, or detect the contrast of the entire face region of the user A and change the direction of the light sources 44R, 44L, and 44C with respect to the user A on the basis of the detected contrast.

The processor 28 of the terminal device 12A may also analyze an image or video of the face region of the user A to thereby detect the color of the face region of the user A. In the case where the detected color is included in a predetermined color tolerance range, the processor 28 of the terminal device 12A does not change the direction of the light sources 44R, 44L, and 44C with respect to the user A. In the case where the color of the face region of the user A is not included in the tolerance range, the processor 28 of the terminal device 12A changes the direction of the light sources 44R, 44L, and 44C with respect to the user A by changing the direction of at least one of the light sources 44R, 44L, 44C or the user A such that the color of the face region of the user A is included in the tolerance range.

The processor 28 of the terminal device 12A may detect the color of a portion of the face region of the user A and change the direction of the light sources 44R, 44L, and 44C with respect to the user A on the basis of the detected color, or detect the color of the entire face region of the user A and change the direction of the light sources 44R, 44L, and 44C with respect to the user A on the basis of the detected color.

The processor 28 of the terminal device 12A may also detect a color distribution of all or a portion of the face region of the user A, and change the direction of the light sources 44R, 44L, and 44C with respect to the user A on the basis of the detected color distribution. For example, the processor 28 of the terminal device 12A may change the direction of the light sources 44R, 44L, and 44C with respect to the user A such that all or a portion of the face region of the user A has a uniform color distribution.

The processor 28 of the terminal device 12A may also analyze an image or video of the face region of the user A to thereby detect blown-out highlights in all or a portion of the face region of the user A. In the case where blown-out highlights are not detected, the processor 28 of the terminal device 12A does not change the direction of the light sources 44R, 44L, and 44C with respect to the user A.

In the case where blown-out highlights are detected, the processor 28 of the terminal device 12A changes the direction of the light sources 44R, 44L, and 44C with respect to the user A by changing the direction of at least one of the light sources 44R, 44L, 44C or the user A such that the blown-out highlights are no longer detected. The processor 28 of the terminal device 12A may change the direction of the light sources 44R, 44L, and 44C with respect to the user A such that blown-out highlights are no longer detected and also such that the brightness of the face region of the user A is included in the tolerance range.

The processor 28 of the terminal device 12A may also analyze an image or video of the face region of the user A to thereby detect the presence or absence of backlight. In the case where backlight is not detected, the processor 28 of the terminal device 12A does not change the direction of the light sources 44R, 44L, and 44C with respect to the user A. In the case where backlight is detected, the processor 28 of the terminal device 12A changes the direction of the light sources 44R, 44L, and 44C with respect to the user A by changing the direction of at least one of the light sources 44R, 44L, 44C or the user A.

In the case where the user A is wearing glasses, the processor 28 of the terminal device 12A may analyze an image or video of the face region of the user A to thereby detect glare on the glasses (for example, the presence or absence of light reflections off the lenses of the glasses). For example, in the case where light reflections off the lenses are not detected, the processor 28 of the terminal device 12A does not change the direction of the light sources 44R, 44L, and 44C with respect to the user A. In the case where light reflections off the lenses are detected, the processor 28 of the terminal device 12A changes the direction of the light sources 44R, 44L, and 44C with respect to the user A by changing at least one of the light sources 44R, 44L, 44C or the user A such that the light reflections off the lenses are no longer detected. In the case where the amount of light reflections off the lenses (for example, the brightness of the reflected light) exceeds a threshold value, the processor 28 of the terminal device 12A may change the direction of the light sources 44R, 44L, and 44C with respect to the user A such that the amount of light reflections off the lenses is the threshold value or less.

The processor 28 of the terminal device 12A may also change the direction of the light sources 44R, 44L, and 44C with respect to the user A on the basis of at least two elements from among the brightness, the presence or absence of shadows, the contrast, the color, the presence or absence of blown-out highlights, the presence or absence of backlight, and the presence or absence of glare on glasses in the face region of the user A. For example, the processor 28 of the terminal device 12A may change the direction of the light sources 44R, 44L, and 44C with respect to the user A such that the brightness of the face region of the user A is included in the brightness tolerance range and also such that the color of the face region of the user A is included in the color tolerance range.

The processor 28 of the terminal device 12A may also change the control of the light sources 44R, 44L, and 44C according to a change in the position of the user A. In Example 3, the processor 28 of the terminal device 12A may change the direction of at least one of the light sources 44R, 44L, or 44C according to the position of the user A.

For example, in the case where the position of the user A changes, the processor 28 of the terminal device 12A changes the direction of at least one of the light sources 44R, 44L, or 44C such that the brightness and color of the face region of the user A does not change. Also, in the case where the position of the user A changes, the processor 28 of the terminal device 12A changes the direction of at least one of the light sources 44R, 44L, or 44C such that shadows, blown-out highlights, or glare on glasses does not occur. For example, the processor 28 of the terminal device 12A changes the direction of the light source(s) to track the change in the position of the user A, such that the user A is illuminated by the light source(s).

The processor 28 of the terminal device 12A may also notify the user A according to the appearance of the user A to encourage the user A to correct his or her appearance. For example, the processor 28 of the terminal device 12A may cause the display of the terminal device 12A to display a message indicating the above encouragement, cause the speaker of the terminal device 12A to emit sounds indicating the above encouragement, or communicate the encouragement to the user A through vibration.

For example, the processor 28 of the terminal device 12A may issue a notification to the user A prompting the user A to change the direction of at least one of the light sources 44R, 44L, or 44C according to the appearance of the user A. The user A receiving the notification may manually change the direction of at least one of the light sources 44R, 44L, or 44C. In the case of encouraging the user to change the direction of the light source(s), the processor 28 of the terminal device 12A does not have to change the direction of the light source(s) automatically.

Note that the processor 20 of the server 10 may also execute the processes according to Example 3.

Example 4

In Example 4, the processor 28 of the terminal device 12A selects one or a plurality of light sources to illuminate the user A from among the light sources 44R, 44L, and 44C according to the appearance of the user A.

For example, the processor 28 of the terminal device 12A analyzes an image or video of the face region of the user A to thereby detect the brightness of the face region of the user A. The processor 28 of the terminal device 12A selects one or a plurality of light sources to illuminate the user A from among the light sources 44R, 44L, and 44C such that the brightness of the face region of the user A is included in a brightness tolerance range. For example, the processor 28 of the terminal device 12*a* selects the light source(s) such that the entire face region of the user A is brighter.

The processor 28 of the terminal device 12A may detect the brightness of a portion (for example, a specified spot) of the face region of the user A and select the light source(s) on the basis of the detected brightness, or detect the brightness of the entire face region of the user A and select the light source(s) on the basis of the detected brightness.

The processor 28 of the terminal device 12A may also detect a brightness distribution of all or a portion of the face region of the user A, and select the light source(s) on the basis of the detected brightness distribution. For example, the processor 28 of the terminal device 12A selects the light source(s) such that all or a portion of the face region of the user A has a uniform brightness distribution.

The processor 28 of the terminal device 12A may also analyze an image or video of the face region of the user A to thereby detect whether or not a shadow is formed on all or a portion of the face region of the user A. The processor 28 of the terminal device 12A selects one or a plurality of light sources to illuminate the user A from among the light sources 44R, 44L, and 44C such that a shadow is no longer detected. The processor 28 of the terminal device 12A may select the light source(s) such that a shadow is no longer detected and also such that the brightness of the face region of the user A is included in the tolerance range.

The processor 28 of the terminal device 12A may also detect a shadow distribution of all or a portion of the face region of the user A, and select the light source(s) on the basis of the detected shadow distribution. For example, the processor 28 of the terminal device 12A may select the light source(s) such that all or a portion of the face region of the user A has a uniform shadow distribution.

The processor 28 of the terminal device 12A may also analyze an image or video of the face region of the user A to thereby detect the contrast of the face region of the user A. The processor 28 of the terminal device 12A selects one or a plurality of light sources to illuminate the user A from among the light sources 44R, 44L, and 44C such that the contrast of the face region of the user A is included in a contrast tolerance range.

The processor 28 of the terminal device 12A may detect the contrast of a portion of the face region of the user A and select the light source(s) on the basis of the detected contrast, or detect the contrast of the entire face region of the user A and select the light source(s) on the basis of the detected contrast.

The processor 28 of the terminal device 12A may also analyze an image or video of the face region of the user A to thereby detect the color of the face region of the user A. The processor 28 of the terminal device 12A selects one or a plurality of light sources to illuminate the user A from among the light sources 44R, 44L, and 44C such that the color of the face region of the user A is included in a color tolerance range.

The processor 28 of the terminal device 12A may detect the color of a portion of the face region of the user A and select the light source(s) on the basis of the detected color, or detect the color of the entire face region of the user A and select the light source(s) on the basis of the detected color.

The processor 28 of the terminal device 12A may also detect a color distribution of all or a portion of the face region of the user A, and select the light source(s) on the basis of the detected color distribution. For example, the processor 28 of the terminal device 12A selects the light source(s) such that all or a portion of the face region of the user A has a uniform color distribution.

The processor 28 of the terminal device 12A may also analyze an image or video of the face region of the user A to thereby detect blown-out highlights in all or a portion of the face region of the user A. The processor 28 of the terminal device 12A selects one or a plurality of light sources to illuminate the user A from among the light sources 44R, 44L, and 44C such that blown-out highlights are no longer detected.

The processor 28 of the terminal device 12A may also analyze an image or video of the face region of the user A to thereby detect the presence or absence of backlight. The processor 28 of the terminal device 12A selects one or a plurality of light sources to illuminate the user A from among the light sources 44R, 44L, and 44C such that backlight is no longer detected.

In the case where the user A is wearing glasses, the processor 28 of the terminal device 12A may analyze an image or video of the face region of the user A to thereby detect glare on the glasses (for example, the presence or absence of light reflections off the lenses of the glasses). The processor 28 of the terminal device 12A selects one or a plurality of light sources to illuminate the user A from among the light sources 44R, 44L, and 44C such that the light reflections off the lenses are no longer detected.

The processor 28 of the terminal device 12A may also select one or a plurality of light sources to illuminate the user A from among the light sources 44R, 44L, and 44C on the basis of at least two elements from among the brightness, the presence or absence of shadows, the contrast, the color, the presence or absence of blown-out highlights, the presence or absence of backlight, and the presence or absence of glare on glasses in the face region of the user A.

The processor 28 of the terminal device 12A may also change the control of the light sources 44R, 44L, and 44C according to a change in the position of the user A. In Example 4, the processor 28 of the terminal device 12A selects one or a plurality of light sources to illuminate the user A according to the position of the user A.

For example, in the case where the position of the user A changes, the processor 28 of the terminal device 12A selects one or a plurality of light sources such that the brightness and color of the face region of the user A does not change. Also, in the case where the position of the user A changes, the processor 28 of the terminal device 12A selects one or a plurality of light sources such that shadows, blown-out highlights, or glare on glasses does not occur. For example, the processor 28 of the terminal device 12A selects one or a plurality of light sources capable of illuminating the user A to track the change in the position of the user A, such that the user A is illuminated by the selected one or plurality of light sources.

The processor 28 of the terminal device 12A may also notify the user A according to the appearance of the user A to encourage the user A to correct his or her appearance. For example, the processor 28 of the terminal device 12A may cause the display of the terminal device 12A to display a message indicating the above encouragement, cause the speaker of the terminal device 12A to emit sounds indicating the above encouragement, or communicate the encouragement to the user A through vibration.

For example, the processor 28 of the terminal device 12A may issue a notification to the user A prompting the user A to select one or a plurality of light sources to illuminate the user A from among the light sources 44R, 44L, and 44C according to the appearance of the user A. The user A receiving the notification may select one or a plurality of light sources to illuminate the user A from among the light sources 44R, 44L, and 44C. The processor 28 of the terminal device 12A turns on the one or plurality of light sources selected by the user A. In the case of encouraging the user to select the light source(s), the processor 28 of the terminal device 12A does not have to select the light source(s) automatically.

Note that the processor 20 of the server 10 may also execute the processes according to Example 4.

Example 5

In Example 5, the processor 28 of the terminal device 12A changes the color of at least one of the light sources 44R, 44L, or 44C according to the appearance of the user A. The color of the light to be emitted by each light source may be changed, or a filter such as a color filter may be used to change the color of light already emitted by each light source.

For example, the processor 28 of the terminal device 12A analyzes an image or video of the face region of the user A to thereby detect the brightness of the face region of the user A. In the case where the detected brightness is included in a predetermined brightness tolerance range, the processor 28 of the terminal device 12A does not change the color of the light sources 44R, 44L, and 44C. In the case where the detected brightness is not included in the brightness tolerance range, the processor 28 of the terminal device 12A changes the color of at least one of the light sources 44R, 44L, or 44C such that the brightness of the face region of the user A is included in the tolerance range. For example, the processor 28 of the terminal device 12A changes the color of at least one of the light sources 44R, 44L, or 44C such that the entire face region of the user A is brighter.

The processor 28 of the terminal device 12A may detect the brightness of a portion (for example, a specified spot) of the face region of the user A and change the color of each light source on the basis of the detected brightness, or detect the brightness of the entire face region of the user A and change the color of each light source on the basis of the detected brightness.

The processor 28 of the terminal device 12A may also detect a brightness distribution of all or a portion of the face region of the user A, and change the color of each light source on the basis of the detected brightness distribution. For example, the processor 28 of the terminal device 12A may change the color of each light source such that all or a portion of the face region of the user A has a uniform brightness distribution.

The processor 28 of the terminal device 12A may also analyze an image or video of the face region of the user A to thereby detect whether or not a shadow is formed on all or a portion of the face region of the user A. In the case where a shadow is not detected, the processor 28 of the terminal device 12A does not change the color of the light sources 44R, 44L, and 44C. In the case where a shadow is detected, the processor 28 of the terminal device 12A changes the color of at least one of the light sources 44R, 44L, or 44C such that the shadow is no longer detected. The processor 28 of the terminal device 12A may change the color of at least one of the light sources 44R, 44L, or 44C such that a shadow is no longer detected and also such that the brightness of the face region of the user A is included in the tolerance range.

The processor 28 of the terminal device 12A may also detect a shadow distribution of all or a portion of the face region of the user A, and change the color of each light source on the basis of the detected shadow distribution. For example, the processor 28 of the terminal device 12A changes the color of each light source such that all or a portion of the face region of the user A has a uniform shadow distribution.

The processor 28 of the terminal device 12A may also analyze an image or video of the face region of the user A to thereby detect the contrast of the face region of the user A. In the case where the detected contrast is included in a predetermined contrast tolerance range, the processor 28 of the terminal device 12A does not change the color of the light sources 44R, 44L, and 44C. In the case where the detected contrast is not included in the contrast tolerance range, the processor 28 of the terminal device 12A changes the color of at least one of the light sources 44R, 44L, or 44C such that the contrast of the face region of the user A is included in the tolerance range.

The processor 28 of the terminal device 12A may detect the contrast of a portion of the face region of the user A and change the color of each light source on the basis of the detected contrast, or detect the contrast of the entire face region of the user A and change the color of each light source on the basis of the detected contrast.

The processor 28 of the terminal device 12A may also analyze an image or video of the face region of the user A to thereby detect the color of the face region of the user A. In the case where the detected color is included in a predetermined color tolerance range, the processor 28 of the terminal device 12A does not change the color of the light sources 44R, 44L, and 44C. In the case where the detected color is not included in the tolerance range, the processor 28 of the terminal device 12A changes the color of at least one of the light sources 44R, 44L, or 44C such that the color of the face region of the user A is included in the tolerance range.

The processor 28 of the terminal device 12A may detect the color of a portion of the face region of the user A and change the color of each light source on the basis of the detected color, or detect the color of the entire face region of the user A and change the color of each light source on the basis of the detected color.

The processor 28 of the terminal device 12A may also detect a color distribution of all or a portion of the face region of the user A, and change the color of each light source on the basis of the detected color distribution. For example, the processor 28 of the terminal device 12A may change the color of each light source such that all or a portion of the face region of the user A has a uniform color distribution.

The processor 28 of the terminal device 12A may also analyze an image or video of the face region of the user A to thereby detect blown-out highlights in all or a portion of the face region of the user A. In the case where blown-out highlights are not detected, the processor 28 of the terminal device 12A does not change the color of the light sources 44R, 44L, and 44C. In the case where blown-out highlights are detected, the processor 28 of the terminal device 12A changes the color of at least one of the light sources 44R, 44L, or 44C such that the blown-out highlights are no longer detected. The processor 28 of the terminal device 12A may change the color of at least one of the light sources 44R, 44L, or 44C such that blown-out highlights are no longer detected and also such that the brightness of the face region of the user A is included in the tolerance range.

The processor 28 of the terminal device 12A may also analyze an image or video of the face region of the user A to thereby detect the presence or absence of backlight. In the case where backlight is not detected, the processor 28 of the terminal device 12A does not change the color of the light sources 44R, 44L, and 44C. In the case where backlight is detected, the processor 28 of the terminal device 12A changes the color of at least one of the light sources 44R, 44L, or 44C.

In the case where the user A is wearing glasses, the processor 28 of the terminal device 12A may analyze an image or video of the face region of the user A to thereby detect glare on the glasses (for example, the presence or absence of light reflections off the lenses of the glasses). For example, in the case where light reflections off the lenses are not detected, the processor 28 of the terminal device 12A does not change the color of the light sources 44R, 44L, and 44C. In the case where light reflections off the lenses are detected, the processor 28 of the terminal device 12A changes the color of at least one of the light sources 44R, 44L, or 44C such that the light reflections off the lenses are no longer detected.

The processor 28 of the terminal device 12A may also change the color of the light sources 44R, 44L, and 44C on the basis of at least two elements from among the brightness, the presence or absence of shadows, the contrast, the color, the presence or absence of blown-out highlights, the presence or absence of backlight, and the presence or absence of glare on glasses in the face region of the user A. For example, the processor 28 of the terminal device 12A may change the color of the light sources 44R, 44L, and 44C such that the brightness of the face region of the user A is included in the brightness tolerance range and also such that the color of the face region of the user A is included in the color tolerance range.

The processor 28 of the terminal device 12A may also change the control of the light sources 44R, 44L, and 44C according to a change in the position of the user A. In Example 5, the processor 28 of the terminal device 12A may change the color of at least one of the light sources 44R, 44L, or 44C according to the position of the user A.

For example, in the case where the position of the user A changes, the processor 28 of the terminal device 12A changes the color of at least one of the light sources 44R, 44L, or 44C such that the brightness and color of the face region of the user A does not change. Also, in the case where the position of the user A changes, the processor 28 of the terminal device 12A changes the color of at least one of the light sources 44R, 44L, or 44C such that shadows, blown-out highlights, or glare on glasses does not occur.

The processor 28 of the terminal device 12A may also notify the user A according to the appearance of the user A to encourage the user A to correct his or her appearance. For example, the processor 28 of the terminal device 12A may cause the display of the terminal device 12A to display a message indicating the above encouragement, cause the speaker of the terminal device 12A to emit sounds indicating the above encouragement, or communicate the encouragement to the user A through vibration.

For example, the processor 28 of the terminal device 12A may issue a notification to the user A prompting the user A to change the color of at least one of the light sources 44R, 44L, or 44C according to the appearance of the user A. The user A receiving the notification may manually change the color of at least one of the light sources 44R, 44L, or 44C. The processor 28 of the terminal device 12A receives the change of color of the light source(s) performed by the user A, and changes the color of the light source(s). In the case of encouraging the user to change the color of the light source(s), the processor 28 of the terminal device 12A does not have to change the color of the light source(s) automatically.

Note that the processor 20 of the server 10 may also execute the processes according to Example 5.

Example 6

In Example 6, the processor 28 of the terminal device 12A changes the type of light source to illuminate the user A according to the appearance of the user A.

For example, in the case where the light sources 44R, 44L, and 44C are different types of light sources (such as the case where the light sources 44R and 44L are LEDs while the light source 44C is a fluorescent light), the processor 28 of the terminal device 12A selects the light source(s) to illuminate the user A from among the light sources 44R, 44L, and 44C according to the appearance of the user A. As another example, in the case where the light sources 44R, 44L, and 44C are provided with multiple types of light sources and are capable of switching among the multiple types of light sources to emit light, the processor 28 of the terminal device 12A changes the type of light source included in the light sources 44R, 44L, and 44C according to the appearance of the user A. The type of light source may be changed according to any process.

For example, the processor 28 of the terminal device 12A analyzes an image or video of the face region of the user A to thereby detect the brightness of the face region of the user A. In the case where the detected brightness is included in a predetermined brightness tolerance range, the processor 28 of the terminal device 12A does not change the type of light source. In the case where the detected brightness is not included in the brightness tolerance range, the processor 28 of the terminal device 12A changes the type of light source such that the brightness of the face region of the user A is included in the tolerance range. For example, the processor 28 of the terminal device 12*a* changes the type of light source such that the entire face region of the user A is brighter.

The processor 28 of the terminal device 12A may detect the brightness of a portion (for example, a specified spot) of the face region of the user A and change the type of light source on the basis of the detected brightness, or detect the brightness of the entire face region of the user A and change the type of light source on the basis of the detected brightness.

The processor 28 of the terminal device 12A may also detect a brightness distribution of all or a portion of the face region of the user A, and change the type of light source on the basis of the detected brightness distribution. For example, the processor 28 of the terminal device 12A may change the type of light source such that all or a portion of the face region of the user A has a uniform brightness distribution.

The processor 28 of the terminal device 12A may also analyze an image or video of the face region of the user A to thereby detect whether or not a shadow is formed on all or a portion of the face region of the user A. In the case where a shadow is not detected, the processor 28 of the terminal device 12A does not change the type of light source 44. In the case where a shadow is detected, the processor 28 of the terminal device 12A changes the type of light source such that the shadow is no longer detected. The processor 28 of the terminal device 12A may change the type of light source such that a shadow is no longer detected and also such that the brightness of the face region of the user A is included in the tolerance range.

The processor 28 of the terminal device 12A may also detect a shadow distribution of all or a portion of the face region of the user A, and change the type of light source on the basis of the detected shadow distribution. For example, the processor 28 of the terminal device 12A changes the type of light source such that all or a portion of the face region of the user A has a uniform shadow distribution.

The processor 28 of the terminal device 12A may also analyze an image or video of the face region of the user A to thereby detect the contrast of the face region of the user A. In the case where the detected contrast is included in a predetermined contrast tolerance range, the processor 28 of the terminal device 12A does not change the type of light source. In the case where the detected contrast is not included in the contrast tolerance range, the processor 28 of the terminal device 12A changes the type of light source such that the contrast of the face region of the user A is included in the tolerance range.

The processor 28 of the terminal device 12A may detect the contrast of a portion of the face region of the user A and change the type of light source on the basis of the detected contrast, or detect the contrast of the entire face region of the user A and change the type of light source on the basis of the detected contrast.

The processor 28 of the terminal device 12A may also analyze an image or video of the face region of the user A to thereby detect the color of the face region of the user A. In the case where the detected color is included in a predetermined color tolerance range, the processor 28 of the terminal device 12A does not change the type of light source. In the case where the color of the face region of the user A is not included in the tolerance range, the processor 28 of the terminal device 12A changes the type of light source such that the color of the face region of the user A is included in the tolerance range.

The processor 28 of the terminal device 12A may detect the color of a portion of the face region of the user A and change the type of light source on the basis of the detected color, or detect the color of the entire face region of the user A and change the type of light source on the basis of the detected color.

The processor 28 of the terminal device 12A may also detect a color distribution of all or a portion of the face region of the user A, and change the type of light source on the basis of the detected color distribution. For example, the processor 28 of the terminal device 12A may change the type of light source such that all or a portion of the face region of the user A has a uniform color distribution.

The processor 28 of the terminal device 12A may also analyze an image or video of the face region of the user A to thereby detect blown-out highlights in all or a portion of the face region of the user A. In the case where blown-out highlights are not detected, the processor 28 of the terminal device 12A does not change the type of light source. In the case where blown-out highlights are detected, the processor 28 of the terminal device 12A changes the type of light source such that the blown-out highlights are no longer detected. The processor 28 of the terminal device 12A may change the type of light source such that blown-out highlights are no longer detected and also such that the brightness of the face region of the user A is included in the tolerance range.

The processor 28 of the terminal device 12A may also analyze an image or video of the face region of the user A to thereby detect the presence or absence of backlight. In the case where backlight is not detected, the processor 28 of the terminal device 12A does not change the type of light source. In the case where backlight is detected, the processor 28 of the terminal device 12A changes the type of light source.

In the case where the user A is wearing glasses, the processor 28 of the terminal device 12A may analyze an image or video of the face region of the user A to thereby detect glare on the glasses (for example, the presence or absence of light reflections off the lenses of the glasses). For example, in the case where light reflections off the lenses are not detected, the processor 28 of the terminal device 12A does not change the type of light source. In the case where light reflections off the lenses are detected, the processor 28 of the terminal device 12A changes the type of light source such that the light reflections off the lenses are no longer detected.

The processor 28 of the terminal device 12A may also change the type of light source on the basis of at least two elements from among the brightness, the presence or absence of shadows, the contrast, the color, the presence or absence of blown-out highlights, the presence or absence of backlight, and the presence or absence of glare on glasses in the face region of the user A. For example, the processor 28 of the terminal device 12A may change the type of light source such that the brightness of the face region of the user A is included in the brightness tolerance range and also such that the color of the face region of the user A is included in the color tolerance range.

The processor 28 of the terminal device 12A may also change the control of the light sources 44R, 44L, and 44C according to a change in the position of the user A. In Example 6, the processor 28 of the terminal device 12A may change the type of light source according to the position of the user A.

For example, in the case where the position of the user A changes, the processor 28 of the terminal device 12A changes the type of light source such that the brightness and color of the face region of the user A does not change. Also, in the case where the position of the user A changes, the processor 28 of the terminal device 12A changes the type of light source such that shadows, blown-out highlights, or glare on glasses does not occur.

The processor 28 of the terminal device 12A may also notify the user A according to the appearance of the user A to encourage the user A to correct his or her appearance. For example, the processor 28 of the terminal device 12A may cause the display of the terminal device 12A to display a message indicating the above encouragement, cause the speaker of the terminal device 12A to emit sounds indicating the above encouragement, or communicate the encouragement to the user A through vibration.

For example, the processor 28 of the terminal device 12A may issue a notification to the user A prompting the user A to change the type of light source of at least one of the light sources 44R, 44L, or 44C according to the appearance of the user A. The user A receiving the notification may manually change the type of light source of at least one of the light sources 44R, 44L, or 44C. In the case of encouraging the user to change the type of light source, the processor 28 of the terminal device 12A does not have to change the type of light source automatically.

Note that the processor 20 of the server 10 may also execute the processes according to Example 6.

Example 7

In Example 7, the processor 28 of the terminal device 12A changes the positional relationship between at least one of the light sources 44R, 44L, or 44C and the camera that captures the user A (for example, the camera of the terminal device 12A) according to the appearance of the user A. The processor 28 of the terminal device 12A changes the positional relationship between the light source(s) and the camera by changing the position of at least one of the light source(s) or the camera.

The light source(s) or the camera may be movable along a rail, or tires may be attached to the light source(s) or the camera, and the light source(s) or the camera may be moved by causing the tires to rotate. For example, by using and controlling a member such as a motor, the light source(s) or the camera may be moved to change the installation location of each.

For example, the processor 28 of the terminal device 12A analyzes an image or video of the face region of the user A to thereby detect the brightness of the face region of the user A. In the case where the detected brightness is included in a predetermined brightness tolerance range, the processor 28 of the terminal device 12A does not change the positional relationship between the light sources 44R, 44L, 44C and the camera of the terminal device 12A. In the case where the detected brightness is not included in the brightness tolerance range, the processor 28 of the terminal device 12A changes the positional relationship between the light sources 44R, 44L, 44C and the camera of the terminal device 12A by changing the position of at least one of the light sources 44R, 44L, 44C or the camera of the terminal device 12A such that the brightness of the face region of the user A is included in the tolerance range. For example, the processor 28 of the terminal device 12A changes the positional relationship between the light sources 44R, 44L, 44C and the camera of the terminal device 12A such that the entire face region of the user A is brighter.

The processor 28 of the terminal device 12A may detect the brightness of a portion (for example, a specified spot) of the face region of the user A and change the positional relationship between the light sources 44R, 44L, 44C and the camera of the terminal device 12A on the basis of the detected brightness, or detect the brightness of the entire face region of the user A and change the positional relationship between the light sources 44R, 44L, 44C and the camera of the terminal device 12A on the basis of the detected brightness.

The processor 28 of the terminal device 12A may also detect a brightness distribution of all or a portion of the face region of the user A, and change the positional relationship between the light sources 44R, 44L, 44C and the camera of the terminal device 12A on the basis of the detected brightness distribution. For example, the processor 28 of the terminal device 12A may change the positional relationship between the light sources 44R, 44L, 44C and the camera of the terminal device 12A such that all or a portion of the face region of the user A has a uniform brightness distribution.

The processor 28 of the terminal device 12A may also analyze an image or video of the face region of the user A to thereby detect whether or not a shadow is formed on all or a portion of the face region of the user A. In the case where a shadow is not detected, the processor 28 of the terminal device 12A does not change the positional relationship between the light sources 44R, 44L, 44C and the camera of the terminal device 12A. In the case where a shadow is detected, the processor 28 of the terminal device 12A changes the positional relationship between the light sources 44R, 44L, 44C and the camera of the terminal device 12A by changing the position of at least one of the light sources 44R, 44L, 44C or the camera of the terminal device 12A such that the shadow is no longer detected. The processor 28 of the terminal device 12A may change the positional relationship between the light sources 44R, 44L, 44C and the camera of the terminal device 12A such that a shadow is no longer detected and also such that the brightness of the face region of the user A is included in the tolerance range.

The processor 28 of the terminal device 12A may also detect a shadow distribution of all or a portion of the face region of the user A, and change the positional relationship between the light sources 44R, 44L, 44C and the camera of the terminal device 12A on the basis of the detected shadow distribution. For example, the processor 28 of the terminal device 12A may change the positional relationship between the light sources 44R, 44L, 44C and the camera of the terminal device 12A such that all or a portion of the face region of the user A has a uniform shadow distribution.

The processor 28 of the terminal device 12A may also analyze an image or video of the face region of the user A to thereby detect the contrast of the face region of the user A. In the case where the detected contrast is included in a predetermined contrast tolerance range, the processor 28 of the terminal device 12A does not change the positional relationship between the light sources 44R, 44L, 44C and the camera of the terminal device 12A. In the case where the detected contrast is not included in the contrast tolerance range, the processor 28 of the terminal device 12A changes the positional relationship between the light sources 44R, 44L, 44C and the camera of the terminal device 12A by changing the position of at least one of the light sources 44R, 44L, 44C or the camera of the terminal device 12A such that the contrast of the face region of the user A is included in the tolerance range.

The processor 28 of the terminal device 12A may detect the contrast of a portion of the face region of the user A and change the positional relationship between the light sources 44R, 44L, 44C and the camera of the terminal device 12A on the basis of the detected contrast, or detect the contrast of the entire face region of the user A and change the positional relationship between the light sources 44R, 44L, 44C and the camera of the terminal device 12A on the basis of the detected contrast.

The processor 28 of the terminal device 12A may also analyze an image or video of the face region of the user A to thereby detect the color of the face region of the user A. In the case where the detected color is included in a predetermined color tolerance range, the processor 28 of the terminal device 12A does not change the positional relationship between the light sources 44R, 44L, 44C and the camera of the terminal device 12A. In the case where the color of the face region of the user A is not included in the tolerance range, the processor 28 of the terminal device 12A changes the positional relationship between the light sources 44R, 44L, 44C and the camera of the terminal device 12A by changing the position of at least one of the light sources 44R, 44L, 44C or the camera of the terminal device 12A such that the color of the face region of the user A is included in the tolerance range.

The processor 28 of the terminal device 12A may detect the color of a portion of the face region of the user A and change the positional relationship between the light sources 44R, 44L, 44C and the camera of the terminal device 12A on the basis of the detected color, or detect the color of the entire face region of the user A and change the positional relationship between the light sources 44R, 44L, 44C and the camera of the terminal device 12A on the basis of the detected color.

The processor 28 of the terminal device 12A may also detect a color distribution of all or a portion of the face region of the user A, and change the positional relationship between the light sources 44R, 44L, 44C and the camera of the terminal device 12A on the basis of the detected color distribution. For example, the processor 28 of the terminal device 12A may change the positional relationship between the light sources 44R, 44L, 44C and the camera of the terminal device 12A such that all or a portion of the face region of the user A has a uniform color distribution.

The processor 28 of the terminal device 12A may also analyze an image or video of the face region of the user A to thereby detect blown-out highlights in all or a portion of the face region of the user A. In the case where blown-out highlights are not detected, the processor 28 of the terminal device 12A does not change the positional relationship between the light sources 44R, 44L, 44C and the camera of the terminal device 12A. In the case where blown-out highlights are detected, the processor 28 of the terminal device 12A changes the positional relationship between the light sources 44R, 44L, 44C and the camera of the terminal device 12A by changing the position of at least one of the light sources 44R, 44L, 44C or the camera of the terminal device 12A such that the blown-out highlights are no longer detected. The processor 28 of the terminal device 12A may change the positional relationship between the light sources 44R, 44L, 44C and the camera of the terminal device 12A such that blown-out highlights are no longer detected and also such that the brightness of the face region of the user A is included in the tolerance range.

The processor 28 of the terminal device 12A may also analyze an image or video of the face region of the user A to thereby detect the presence or absence of backlight. In the case where backlight is not detected, the processor 28 of the terminal device 12A does not change the positional relationship between the light sources 44R, 44L, 44C and the camera of the terminal device 12A. In the case where backlight is detected, the processor 28 of the terminal device 12A changes the positional relationship between the light sources 44R, 44L, 44C and the camera of the terminal device 12A by changing the position of at least one of the light sources 44R, 44L, 44C or the camera of the terminal device 12A.

In the case where the user A is wearing glasses, the processor 28 of the terminal device 12A may analyze an image or video of the face region of the user A to thereby detect glare on the glasses (for example, the presence or absence of light reflections off the lenses of the glasses). For example, in the case where light reflections off the lenses are not detected, the processor 28 of the terminal device 12A does not change the positional relationship between the light sources 44R, 44L, 44C and the camera of the terminal device 12A. In the case where light reflections off the lenses are detected, the processor 28 of the terminal device 12A changes the positional relationship between the light sources 44R, 44L, 44C and the camera of the terminal device 12A by changing at least one of the light sources 44R, 44L, 44C or the camera of the terminal device 12A such that the light reflections off the lenses are no longer detected. In the case where the amount of light reflections off the lenses (for example, the brightness of the reflected light) exceeds a threshold value, the processor 28 of the terminal device 12A may change the positional relationship between the light sources 44R, 44L, 44C and the camera of the terminal device 12A such that the amount of light reflections off the lenses is the threshold value or less.

The processor 28 of the terminal device 12A may also change the positional relationship between the light sources 44R, 44L, 44C and the camera of the terminal device 12A on the basis of at least two elements from among the brightness, the presence or absence of shadows, the contrast, the color, the presence or absence of blown-out highlights, the presence or absence of backlight, and the presence or absence of glare on glasses in the face region of the user A. For example, the processor 28 of the terminal device 12A may change the positional relationship between the light sources 44R, 44L, 44C and the camera of the terminal device 12A such that the brightness of the face region of the user A is included in the brightness tolerance range and also such that the color of the face region of the user A is included in the color tolerance range.

The processor 28 of the terminal device 12A may also change the positional relationship between the light sources 44R, 44L, 44C and the camera of the terminal device 12A according to a change in the position of the user A. In Example 7, the processor 28 of the terminal device 12A may change the position of at least one of the light sources 44R, 44L, 44C or the camera of the terminal device 12A according to the position of the user A.

For example, in the case where the position of the user A changes, the processor 28 of the terminal device 12A may change the position of at least one of the light sources 44R, 44L, 44C or the camera of the terminal device 12A such that the brightness and color of the face region of the user A does not change. Also, in the case where the position of the user A changes, the processor 28 of the terminal device 12A changes the position of at least one of the light sources 44R, 44L, 44C or the camera of the terminal device 12A such that shadows, blown-out highlights, or glare on glasses does not occur. For example, the processor 28 of the terminal device 12A changes the position of the light source(s) to track the change in the position of the user A such that the user A is illuminated by the light source(s), and changes the position of the camera of the terminal device 12A to capture the user A in the illuminated state.

The processor 28 of the terminal device 12A may also notify the user A according to the appearance of the user A to encourage the user A to correct his or her appearance. For example, the processor 28 of the terminal device 12A may cause the display of the terminal device 12A to display a message indicating the above encouragement, cause the speaker of the terminal device 12A to emit sounds indicating the above encouragement, or communicate the encouragement to the user A through vibration.

For example, the processor 28 of the terminal device 12A may issue a notification to the user A prompting the user A to change the position of at least one of the light sources 44R, 44L, 44C or the camera of the terminal device 12A according to the appearance of the user A. The user A receiving the notification may manually change the position of at least one of the light sources 44R, 44L, 44C or the camera of the terminal device 12A. In the case of encouraging the user to change the position, the processor 28 of the terminal device 12A does not have to change the position of the light source(s) or the camera of the terminal device 12A automatically.

At least two of the above Examples 1 to 7 may also be combined. In other words, the processor 28 of the terminal device 12A may control at least two elements from among the intensity of the light source(s), the positional relationship between the light source(s) and the user A, the direction of the light source(s) with respect to the user A, the selection of one or more light sources to illuminate the user A, the color of the light source(s), the type of the light source(s), and the positional relationship between the light source(s) and the camera according to the appearance of the user A. For example, the processor 28 of the terminal device 12A may change the intensity of the light source(s) while also changing the positional relationship between the light source(s) and the user A or the positional relationship between the light source(s) and the camera according to the appearance of the user A. As a different example, the processor 28 of the terminal device 12A may also change the intensity, direction, and color of the light source(s) according to the appearance of the user A.

In Examples 1 to 7 described above, the processor 28 of the terminal device 12A additionally may execute image processing on an image or video of the user A displayed in the online conference according to the appearance of the user A.

For example, the processor 28 of the terminal device 12A may change the brightness of the image or video of the user A such that the brightness of the face region of the user A is included in a tolerance range, execute a process of erasing a shadow appearing in the image or video in the case where a shadow is detected, change the brightness of the image or video of the user A such that the contrast of the face region of the user A is included in a tolerance range, change the color of the image or video of the user A such that the color of the face region of the user A is included in a tolerance range, or execute a process of correcting blown-out highlights, backlight, or glare on glasses appearing in the image or video in the case where blown-out highlights, backlight, or glare on glasses is detected. The processor 28 of the terminal device 12A may execute at least one of Examples 1 to 7 and also execute at least one of the above types of image processing, or execute at least one of the above types of image processing without executing any of Examples 1 to 7.

In the case where image processing alone is sufficient to correct the image or video of the face region of the user such that the brightness, contrast, color, or the like is included in a tolerance range or such that shadows, blown-out highlights, backlight, or glare on glasses does not appear, the processor 28 of the terminal device 12A does not have to change the control of the light source(s). For example, in cases where changing the control of the light source(s) would increase power consumption, the increase may be avoided by not changing the control of the light source(s).

Note that the processor 20 of the server 10 may also execute the processes according to Example 7.

Example 8

Hereinafter, Example 8 will be described. In Example 8, the processor 28 of the terminal device 12A performs a control of blocking light from a source other than the light source(s) illuminating the user according to the light from a source other than the light source(s) illuminating the user. The light from a source other than the light source(s) illuminating the user may be outside light or light at a construction site (such as the light of an arc discharge used for welding), for example.

Figure 8:
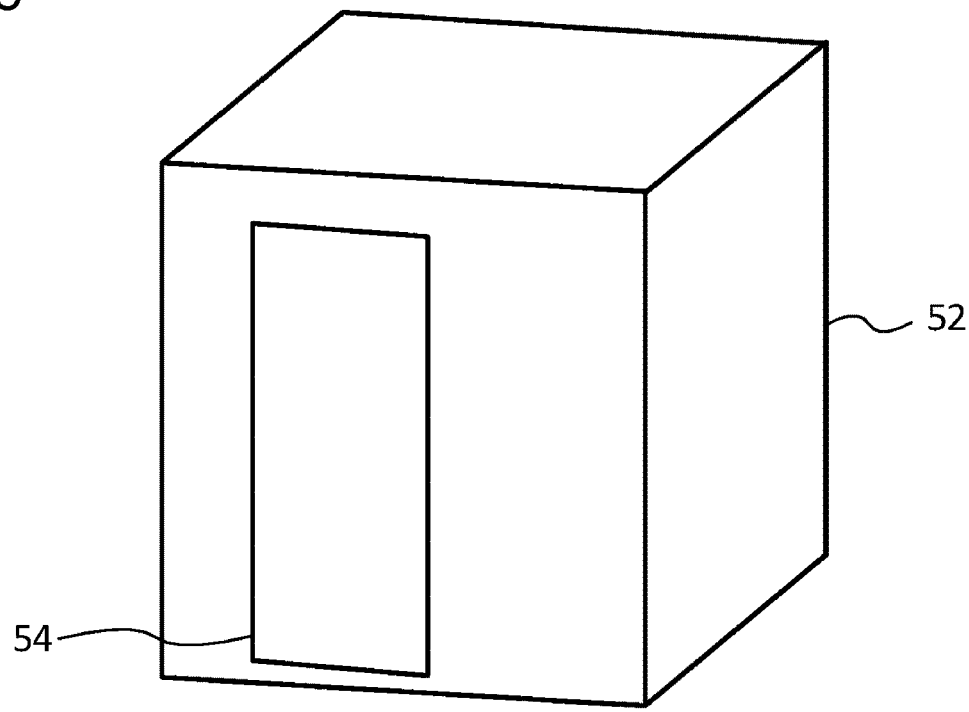
FIG. 8 is a diagram illustrating an exterior of a booth.
Figure 9:
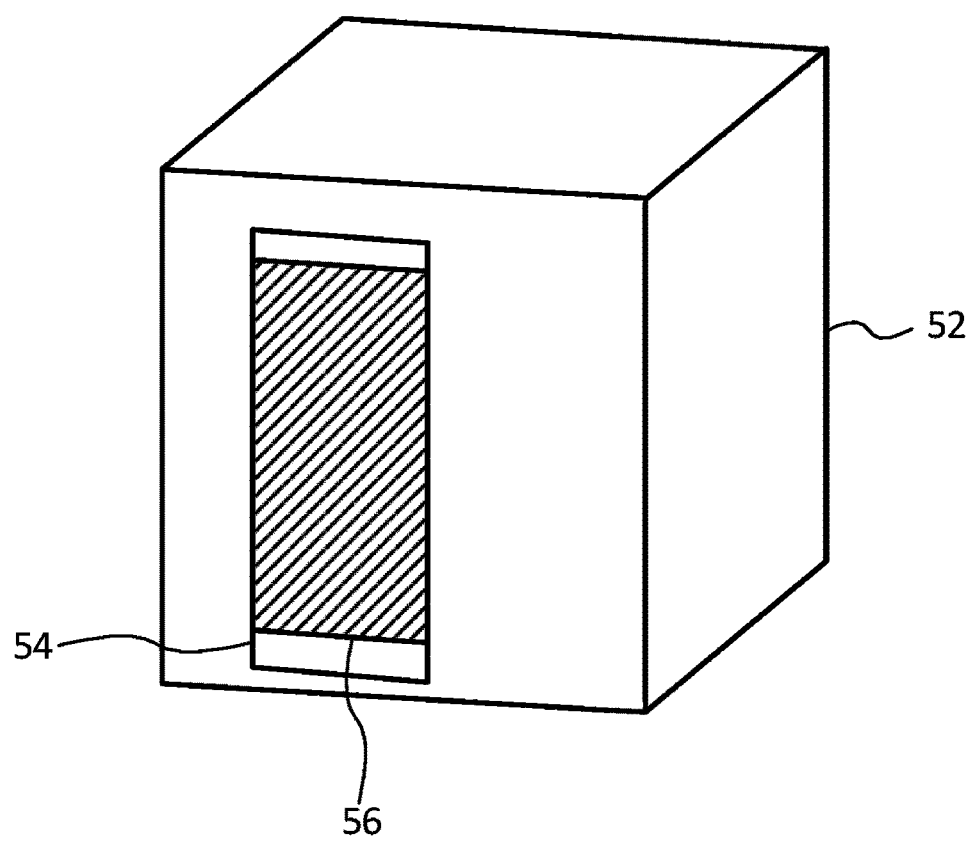
FIG. 9 is a diagram illustrating an exterior of a booth.

Hereinafter, Example 8 will be described in detail with reference to FIGS. 8 and 9. FIGS. 8 and 9 schematically illustrate the exterior of a booth 52 given as one example of a place used for the online conference. The booth 52 has walls and a ceiling, and a space inside the booth 52 is the space enclosed by the walls and the ceiling. Inside the booth 52, equipment such as the light sources, display, and chair illustrated in FIG. 5 are installed, for example, and a user is able to participate in the online conference inside the booth 52.

A door 54 for entering and exiting the booth 52 is installed on the booth 52. The door 54 includes a transparent glass pane or acrylic panel for example, and outside light enters the booth 52 through the door 54. The outside light is not light from the light source(s) illuminating the user A.

In the case where the brightness of the outside light entering the booth 52 is a threshold value or higher, the processor 28 of the terminal device 12A blocks the outside light, whereas in the case where the brightness of the outside light entering the booth 52 is lower than the threshold value, the processor 28 of the terminal device 12A does not block the outside light. For example, a sensor is installed near the door 54 or the like to detect the brightness of the outside light entering the booth 52.

For example, in the case where the brightness of the outside light entering the booth 52 is the threshold value or higher, the processor 28 of the terminal device 12A closes a shutter 56 installed on the door 54, as illustrated in FIG. 9. By closing the shutter 56, the amount of outside light entering the booth 52 may be reduced. In the case where the brightness of the outside light entering the booth 52 is lower than the threshold value, the processor 28 of the terminal device 12A opens the shutter 56, as illustrated in FIG. 8.

As another example, in the case where a dimming glass is installed in the door 54, the processor 28 of the terminal device 12A may block the outside light entering the booth 52 by lowering the transparency of the dimming glass (for example, by making the dimming glass opaque). As yet another example, a dimming film may also be used.

By blocking the outside light entering the booth 52, the occurrence of backlight in the image or video of the user A displayed in the online conference may be suppressed, for example.

The processor 28 of the terminal device 12A may close the shutter 56 automatically or set the dimming glass to an opaque state automatically, or encourage the user to close the shutter 56 or set the dimming glass to an opaque state. For example, the processor 28 of the terminal device 12A may cause the display to display a message indicating the above encourage, or cause the speaker to emit sounds indicating the above encouragement.

Note that the processor 20 of the server 10 may also execute the processes according to Example 8.

Example 9

Hereinafter, Example 9 will be described. In Example 9, the processor 28 of the terminal device 12A changes the control of the light sources 44R, 44L, and 44C according to a use status of the online conference by the user A.

For example, the processor 28 of the terminal device 12A changes the output of the light sources 44R, 44L, and 44C according to the use status of the online conference by the user A. Specifically, an energy-saving mode may be set, and by causing the processor 28 of the terminal device 12A to change the mode of the light sources 44R, 44L, and 44C to the energy-saving mode according to the use status of the online conference by the user A, power consumption is reduced. The energy-saving mode is a mode that turns off or reduces the intensity of at least one of the light sources 44R, 44L, or 44C.

To explain in terms of a specific example, the processor 28 of the terminal device 12A changes the output of the light source(s) between the case where there is a demand to illuminate the user A with the light source(s) and the case where there is no demand to illuminate the user A with the light source(s). In the case where there is a demand to illuminate the user A with the light source(s), the processor 28 of the terminal device 12A does not change the mode of the light source(s) to the energy-saving mode, whereas in the case where there is no demand to illuminate the user A with the light source(s), the processor 28 of the terminal device 12A changes the mode of the light source(s) to the energy-saving mode. For example, the mode of the light source(s) is not changed to the energy-saving mode in the case where the user A is or is likely to be a subject of attention in the online conference, and the mode of the light source(s) is changed to the energy-saving mode in the case where the user A is not or is not likely to be a subject of attention.

For example, in the case where an image or video of the face region of the user A is enlarged for display on the screen 32 for the online conference, the processor 28 of the terminal device 12a does not change the mode of the light source(s) to the energy-saving mode. In the case where an image or video of the face region of the user A is enlarged for display on the screen 32 for the online conference, the processor 28 of the terminal device 12a does not change the mode of the light source(s) to the energy-saving mode. The enlargement of the image or video may be performed by the user A or by the users B, C, and D acting as communication peers. For example, the user A may perform an operation of enlarging the display area 32A to enlarge the display of the image or video of the face region of the user A. As another example, the display area 32A may be enlarged while the user A is speaking, and the display of the image or video of the face region of the user A may also be enlarged accordingly.

The processor 28 of the terminal device 12A may change the intensity of at least one of the light sources 44R, 44L, or 44C according to the size of the image or video of the face region of the user A being displayed on the screen 32. For example, the processor 28 of the terminal device 12A may increase the intensity of the light source(s) as the image or video of the face region of the user A increases in size. Note that the intensity may also be adjusted in stages.

As another example, in the case where the user A is speaking in the online conference, the processor 28 of the terminal device 12A does not change the mode of the light source(s) to the energy-saving mode. In the case where the user A is not speaking, the processor 28 of the terminal device 12A changes the mode of the light source(s) to the energy-saving mode. Whether the user A is speaking or not is determined by causing the camera of the terminal device 12A to capture the face region of the user A and causing the processor 28 of the terminal device 12A to analyze the image or video generated by the capture, for example. The processor 28 of the terminal device 12A may also determine that the user A is speaking in the case where the microphone of the terminal device 12A picks up sound. In this case, the processor 28 of the 12A may determine whether or not the picked-up sound is the voice of the user A by analyzing the picked-up sound, and determine that the user A is speaking in the case where the voice of the user A is picked up.

As yet another example, in the case where the user A is specified as a conversation partner in the online conference, the processor 28 of the terminal device 12A does not change the mode of the light source(s) to the energy-saving mode. In the case where the user A is not specified as a conversation partner in the online conference, the processor 28 of the terminal device 12A changes the mode of the light source(s) to the energy-saving mode. For example, in the case where three or more users are participating in the online conference, and a user other than the user A specifies the user A as a conversation partner, the processor 28 of the terminal device 12A does not change the mode of the light source(s) to the energy-saving mode. In the case where the user A is not specified as a conversation partner by another user, the processor 28 of the terminal device 12A changes the mode of the light source(s) to the energy-saving mode.

For example, the processor 28 of the terminal device 12A uses voice recognition technology to determine whether or not the user A is specified as a conversation partner. For example, in the case where the user B speaks information for identifying the user A (such as account information, a name, or an ID), the processor 28 of the terminal device 12A analyzes the speech to specify the user A as the conversation partner of the user B.

As another example, the processor 28 of the terminal device 12A analyzes an image or video of another user other than the user A to detect the other user's line of sight and determine whether or not the other user is looking at the user A. For example, in the case where the other user is looking at the display area 32A (that is, in the case where the other user's line of sight leads to the display area 32A), the processor 28 of the terminal device 12A specifies the user A as the conversation partner of the other user. Note that the processor 28 of the terminal device 12 used by the conversation partner of the user A may also specify the user A as the conversation partner by detecting the partner's line of sight, and transmit the specification result to the terminal device 12A.

As yet another example, the processor 28 of the terminal device 12A may also specify who is conversing with whom on the basis of information such as the context of speech between multiple users participating in the online conference or movements (for example, nodding) by each user.

Note that the processor 20 of the server 10 may also execute the processes according to Example 9.

Example 10

Hereinafter, Example 10 will be described. In Example 10, the processor 28 of the terminal device 12A changes the control of the light sources 44R, 44L, and 44C according to the light source(s) or status of another user participating in the online conference with the user A (that is, a user other than the user A). In the following, the other user is the user B as an example.

The processor 28 of the terminal device 12A used by the user A and the processor 28 of the terminal device 12B used by the user B share setting information about the light source(s) being used by each of the users A and B such that the users participating in the online conference (for example, the user A and the user B) have approximately the same appearance, and control the light source(s) such that the users A and B appear to be in the same environment in the online conference. Obviously, a user specified by the user A and the user A may also be able to participate in the online conference in the same environment without enabling all users participating in the online conference to be able to participate in the online conference in the same environment.

Additionally, in the case where another user attending the online conference is not using a light source configurable with particular settings, but it is desirable to match the environment of the other user with the environment of the user A, the processor 28 of the terminal device 12A may acquire information about the brightness and color of the other user's environment, and use the light source(s) or the like to adjust the environment of the user A to match the acquired brightness and color. Examples of the way of acquiring the other user's environment include an illuminance sensor and an image capture device such as a camera. Note that in the case of adjusting the light source(s) using the above function, if the other user and the user A appear the same before participating in the online conference, or if the difference in appearance is included within a tolerance range, the processor 28 of the terminal device 12A may also cause the user A to participate in the online conference without performing the above adjustment.

Example 11

Hereinafter, Example 11 will be described. In Example 11, the processor 28 of the terminal device 12A changes the control of the light sources 44R, 44L, and 44C according to a request from another user participating in the online conference with the user A (that is, a user other than the user A).

In the case where an interactive online service is used, the organizer of the service may want to control the appearance of a peer. For example, in the case where the online conference is used for a purpose such as interviewing a job candidate, if the peer appears dark and the peer's face is difficult to see clearly, it may be difficult to confirm that the peer is the person in question, and a situation may occur in which the interviewer interviews a different person. To address this issue, a function that enables a different user to control the online appearance of a peer is desirable. Accordingly, in the case where the user (such as an interviewer) specifying a subject to adjust issues a request to control the appearance of a connected peer online, and the peer consents to the control, the processor 28 of the terminal device 12 controls the peer's appearance. For example, the processor 28 of the terminal device 12 is enabled to control a light source provided in the terminal device 12 used by the peer or a light source disposed near the peer. The processor 28 of the terminal device 12 may also apply image processing to an image showing the peer. Also, a mode that controls the light source(s) without obtaining the peer's consent may be provided.

In Examples 1 to 11 described above, the processor 28 of the terminal device 12A may also coordinate one or more light sources preinstalled in the place 40 to be used for the online conference (for example, the light sources 44R, 44L, 44C, or a ceiling light) and a light source carried by the user A, and control these light sources according to the appearance of the user A. The light source(s) preinstalled in the place 40 are the light sources 44R, 44L, 44C, and lights installed on the ceiling or walls, for example. The light source carried by the user A is a light source (such as a built-in smartphone light) installed in the terminal device 12A that the user A brings into the place 40, for example.

In Examples 1 to 9 described above, in the case where the online conference ends for the user A, the processor 28 of the terminal device 12A may also turn off the light source(s) (for example, the light sources 44R, 44L, and 44C) used only to illuminate the user A. In this case, the processor 28 of the terminal device 12A does not turn off a light source such as a light installed in the ceiling of the place 40. The case where the online conference ends for the user A includes, for example, the case where all of the users A, B, C, and D log out of the online conference, the case where the user A logs out of the online conference, or the case where the user A leaves the online conference temporarily without logging out. For example, in the case where the user A logs out of the online conference, the processor 28 of the terminal device 12A turns off the light sources 44R, 44L, and 44C.

In Examples 1 to 11 described above, the processor 28 of the terminal device 12A may also check the appearance of the user A before the user A starts the online conference, and cause the user A to participate in the online conference if permission is obtained from the user A. In the case where permission is not obtained from the user A, the processor 28 of the terminal device 12A does not cause the user A to participate in the online conference. As another example, in the case where permission is not obtained from the user A, the processor 28 of the terminal device 12A may display an image or video figuratively representing the user A in the display area 32A without displaying an image or video of the user A generated by image capture in the display area 32A, or display a character string for identifying the user A in the display area 32A without displaying an image or video of the user A in the display area 32A.

For example, the user A is captured by the camera of the terminal device 12A, and an image or video generated by the capture is displayed on the display of the terminal device 12A. The processor 28 of the terminal device 12A checks the appearance of the user A on the basis of the image or video, and changes the control of the light sources 44R, 44L, and 44C or executes image processing on the image or video of the user A according to the appearance of the user A. The user A checks the image or video of the user A after controlling the light source(s) or executing the image processing, and allows or disallows participation in the online conference while displaying the image or video in the online conference.

In the case where the user A gives permission, the processor 28 of the terminal device 12A causes the user A to log in to the online conference and participate in the online conference, and displays the image or video of the user A generated by the capture by the camera of the terminal device 12A in the display area 32A.

In the case where the user A does not give permission, the processor 28 of the terminal device 12A does not cause the user A participate in the online conference, or alternatively, causes the user A to participate in the online conference but does not display the image or video of the user A generated by the capture in the display area 32A.

The function of each unit in the server 10 and the terminal devices 12 above is realized by the cooperative action of hardware and software as an example. For example, the functions of each device are achieved by causing a processor in each device to load and execute a program stored in a memory of each device. The program is stored in the memory through a recording medium such as a CD or DVD, or alternatively through a communication channel such as a network.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing device comprising:
a processor configured to:
change a control of a light source to illuminate a user according to an appearance of the user in an online conference, and
change an output of the light source between where a still or moving image of a face region of the user is displayed in an enlarged state on a screen of the online conference and where the still or moving image of the face region of the user is not displayed in an enlarged state.

2. The information processing device according to claim 1, wherein
the processor is configured to:
control an intensity of the light source according to the appearance of the user.

3. The information processing device according to claim 1, wherein
the processor is configured to:
change a positional relationship between the light source and the user according to the appearance of the user.

4. The information processing device according to claim 1, wherein
the processor is configured to:
change a direction of the light source with respect to the user according to the appearance of the user.

5. The information processing device according to claim 1, wherein
the processor is configured to:
select one or a plurality of light sources to illuminate the user according to the appearance of the user.

6. The information processing device according to claim 1, wherein
the processor is configured to:
change a color of the light source according to the appearance of the user.

7. The information processing device according to claim 1, wherein
the processor is configured to:
change a type of the light source according to the appearance of the user.

8. The information processing device according to claim 1, wherein
the processor is configured to:
change a positional relationship between the light source and a camera that captures a still or moving image of the user according to the appearance of the user.

9. The information processing device according to claim 1, wherein
the processor is further configured to:
change the control of the light source according to a change in a position of the user.

10. The information processing device according to claim 1, wherein
an image of the user to be displayed in the online conference is a still or moving image captured by a camera carried by the user.

11. The information processing device according to claim 1, wherein
the processor is further configured to:
execute image processing on a still or moving image of the user to be displayed on the online conference according to the appearance of the user.

12. The information processing device according to claim 1, wherein
the processor is further configured to:
notify the user with an encouragement to correct the appearance of the user according to the appearance of the user.

13. The information processing device according to claim 1, wherein
the processor is configured to:
change an output of the light source between a case where the user is speaking in the online conference and a case where the user is not speaking.

14. The information processing device according to claim 1, wherein
the processor is further configured to:
change the control of a light source to illuminate the user according to an appearance of a different user who participates in the online conference.

15. The information processing device according to claim 1, wherein
the processor is further configured to:
change the control of a light source to illuminate the user according to a request to change the appearance of the user who participates in the online conference.

16. The information processing device according to claim 1, wherein
the processor is further configured to:
coordinate a light source preinstalled in a place used for the online conference and a light source carried by the user.

17. The information processing device according to claim 1, wherein
the processor is configured to:
check the appearance of the user before the user participates in the online conference, and cause the user to participate in the online conference if permission is obtained from the user.

18. An information processing method comprising:
changing a control of a light source to illuminate a user according to an appearance of the user in an online conference, and
changing an output of the light source between where a still or moving image of a face region of the user is displayed in an enlarged state on a screen of the online conference and where the still or moving image of the face region of the user is not displayed in an enlarged state.

19. A non-transitory computer readable medium storing a program causing a computer to execute a process for processing information, the process comprising:
changing a control of a light source to illuminate a user according to an appearance of the user in an online conference, and
changing an output of the light source between where a still or moving image of a face region of the user is displayed in an enlarged state on a screen of the online conference and where the still or moving image of the face region of the user is not displayed in an enlarged state.

* * * * *